US006804636B2

(12) United States Patent
Senta et al.

(10) Patent No.: US 6,804,636 B2
(45) Date of Patent: Oct. 12, 2004

(54) CONTROL PROGRAM DEVELOPMENT SUPPORT APPARATUS

(75) Inventors: Yosuke Senta, Kawasaki (JP); Yuichi Sato, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 751 days.

(21) Appl. No.: 09/834,889

(22) Filed: Apr. 16, 2001

(65) Prior Publication Data

US 2002/0022939 A1 Feb. 21, 2002

(30) Foreign Application Priority Data

Aug. 21, 2000 (JP) .................................... 2000-249521

(51) Int. Cl.[7] .......................... G06G 7/62; G06F 13/10; G06F 13/12; G06F 17/50
(52) U.S. Cl. ............................ 703/13; 703/20; 703/24; 703/2; 700/97; 700/29; 700/30; 700/31
(58) Field of Search ............................... 703/2, 7, 8, 9, 703/13, 14, 18, 20, 21, 24; 702/182; 700/29, 30, 31, 97

(56) References Cited

U.S. PATENT DOCUMENTS

| 4,575,776 | A | * | 3/1986 | Stephens et al. ......... 360/78.09 |
|---|---|---|---|---|
| 5,331,579 | A | * | 7/1994 | Maguire et al. ............... 703/2 |
| 5,633,800 | A | * | 5/1997 | Bankert et al. ............. 702/183 |
| 5,936,858 | A | * | 8/1999 | Arai .............................. 700/30 |
| 6,249,714 | B1 | * | 6/2001 | Hocaoglu et al. ............. 700/97 |
| 6,359,748 | B1 | * | 3/2002 | Goker ...................... 360/78.02 |
| 6,389,384 | B1 | * | 5/2002 | Hampshire et al. ........... 703/26 |
| 6,434,454 | B1 | * | 8/2002 | Suzuki ......................... 701/29 |
| 6,594,106 | B1 | * | 7/2003 | Serrano et al. .......... 360/78.09 |
| 6,686,716 | B1 | * | 2/2004 | Predina et al. .............. 318/560 |
| 6,741,417 | B2 | * | 5/2004 | Hsin et al. ............... 360/78.05 |

OTHER PUBLICATIONS

Luk et al., Development of a Low Cost Software Pakage for the Design of a Brushless DC Motor Controller, IEEE 1994.*
Seaward et al., Digital Simulation and Model Validation of Brushless DC Machines, IEEE 1989.*
Pillay et al., Modeling, Simulation, and Analysis of Permanent–Magnet Motor Drives, Part II: The Brushless DC Motor Drive, IEEE 1989.*

* cited by examiner

Primary Examiner—William Thomson
(74) Attorney, Agent, or Firm—Staas & Halsey LLP

(57) ABSTRACT

An apparatus enables development and debugging of a control program for controlling a relatively small product having rapid response without using an actual mechanism. A simulation unit simulates an operation of a mechanism, in a simulation cycle shorter than a control cycle, for a time corresponding to the control cycle, and outputs a state variable of the mechanism to a holding circuit. When the state variable is held in the holding circuit, a simulation control unit makes the simulation unit shift to a response waiting state and makes a control program executing unit calculate a controlled variable. When the controlled variable is held in the holding circuit, the simulation control unit makes the control program execution unit shift to a response waiting state and makes the simulation unit initiate a simulating operation. The apparatus is applied when a control program for every product requiring a precise servo control is developed.

17 Claims, 18 Drawing Sheets

F I G. 13
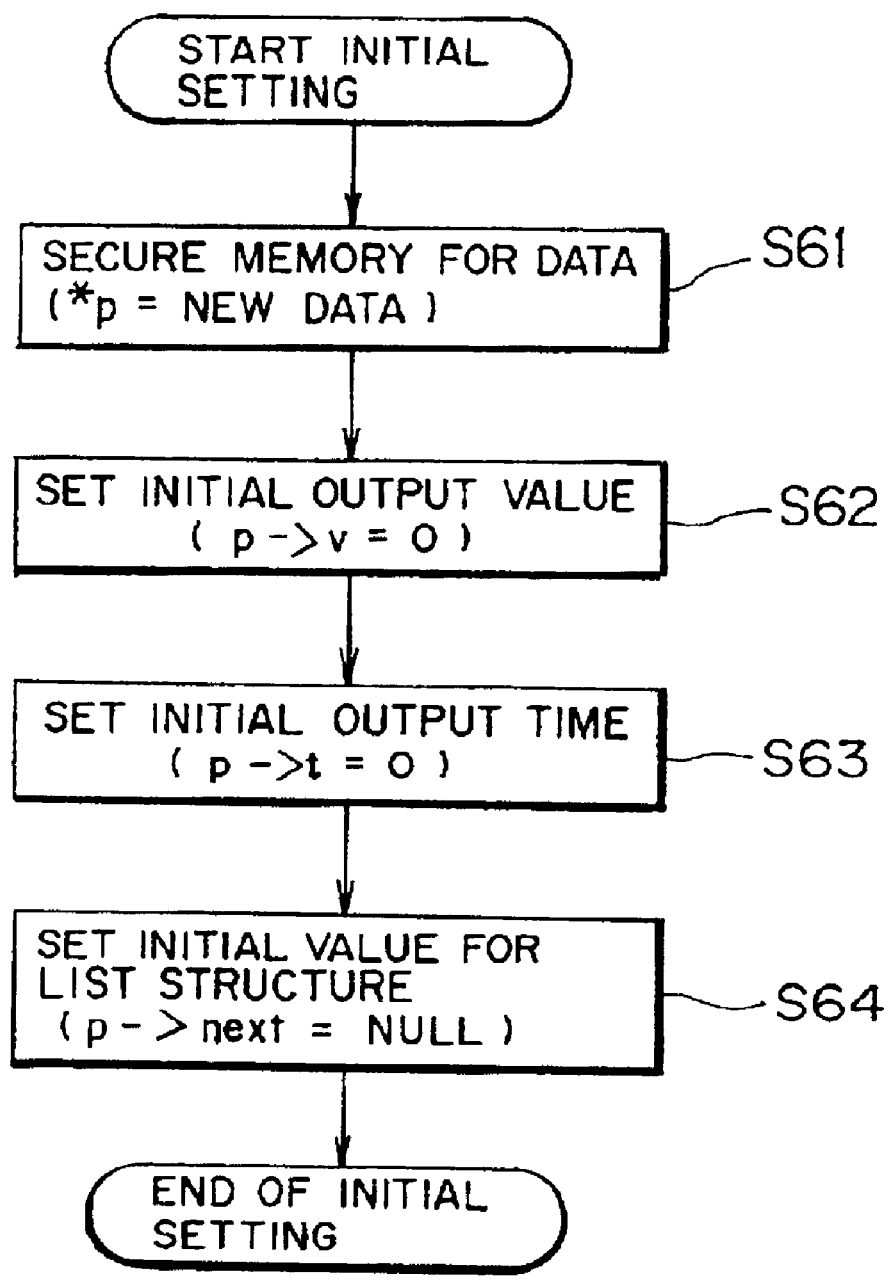

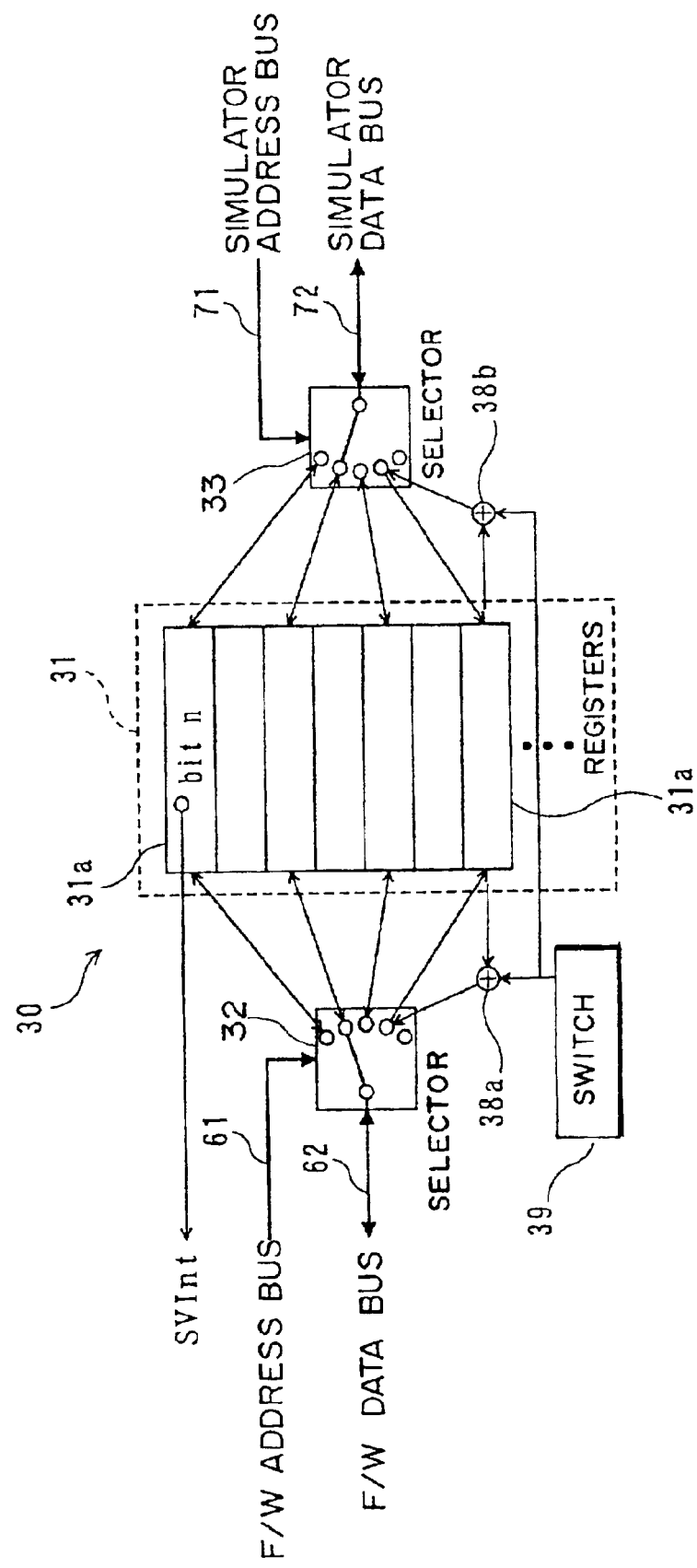

CONTROL PROGRAM DEVELOPMENT SUPPORT APPARATUS

BACKGROUND OF THE INVENTION

1. Field of the Invention

The present invention relates to a technique supporting development of a servo control part (servo control program) of a control program for a product of a relatively small size and having rapid response. Particularly, the present invention relates to a control program development support apparatus suitable for use when a servo control program (firmware) for every product requiring a precise servo control such as amagnetic disk drive (HDD), an optical diskdrive (CD, MO, DVD, MD), amagnetic tape unit (DAT, VTR), an NC machine tool, etc.

2. Description of the Related Art

When a mechanism having an actuator (motor) and a sensor, and operating three-dimensionally is designed, a plan of the mechanism is first worked out. Then, detailed design, drawing issue and parts preparation are done, the parts are assembled to built a prototype, then operations and the like of the prototype are evaluated, in general. After that, a process of changing the design according to a result of the evaluation, manufacturing a prototype whose design has been changed, and again making evaluation is repeated. When a result of the evaluation is satisfactory, the design is completed.

In order to operate the mechanism designed as above, a control program for controlling the mechanism is generally developed. The control program is executed by a microcomputer built in the mechanism that is a controlled object. Hereinafter, the above control program executed by the microcomputer is occasionally referred to as a built-in software.

When the above control program (built-in software) is developed, it is heretofore necessary that a trial product (prototype) of the mechanism to be controlled is completed. Namely, the mechanism can be operated only after the trial product is completed, and development of the built-in software using the trial product can be initiated.

Development of the built-in software is done in the following manner while the trial product is actually operated after the trial product is completed. First, rough design of the built-in software is made, detailed design is made on the basis of the rough design, a built-in software is created by coding a result of the detailed design, and the built-in software is debugged.

Meanwhile, construction and validation of the servo mechanism of the firmware is heretofore done by using an actual mechanism (prototype), like development of a built-in software described above.

When construction and validation of the servo mechanism of the firmware is done in the above manner, inspection can be done only after a prototype is completed, a cost and a time are therefore required for the development, which is inefficient. In addition, inspection using a prototype causes such a disadvantage that even when a firmware program is stopped due to an event break or the like, a motor configuring the servo mechanism keeps rotating so that step debugging is impossible.

Further, a servo mechanism control program for a product produced on the order of tens of thousands per month has to be able to cope with variations in mechanism to a certain degree. In development using an actual mechanism, it is difficult to obtain a mechanism in a desired state considering the above variations, and it is also difficult to know how much the firmware can cope with variations.

For this reason, it is desired to effectively develop (construct, validate) a firmware without using a prototype by making a virtual model on a computer and controlling the model by an actual firmware. If such a technique is realized, anticipatory development becomes possible, use of a step debugging function or the like becomes possible since an actual motor is not used, a novel control technique using a new actuator or sensor can be simply validated without making a prototype.

There has been a system for controlling a model in a simulator instead of an actual product by a control program operating on another computer such as HIL (Hardware In the Loop) simulation system by dSPACE, Inc., for example. Since this system simulates in real time, objects of the simulation are products having slow response (for example, products that can be simulated at not less than 1 msec simulation time intervals) such as automobiles, ships and the like. Therefore, it is difficult for this system to simulate a product of a relatively small size and having rapid response (for example, a product that should be simulated at each interval of about 100 $\mu$sec) such as a magnetic disk drive (HDD) or the like.

Inventors of the present invention have proposed a support system by which a built-in software (control program) can developed separately from mechanism design without producing a trial product of the mechanism, putting a three-dimensional real-time simulation apparatus in the center. Validation of the control program by this support system is done on the task level. In this support system, an operation of the actuator in response to a command from the control program's side is simulated, and the control program is validated on the basis of an ON/OFF signal of the sensor according to the operation. Therefore, this support system cannot validate (develop, debug) of the control program on the servo level analyzing dynamics of the model.

The servo mechanism is an automatic feed-back control system for mechanical motions, which is used to control a system in which a controlled variable or a control output is a mechanical position [or one of inductive variables (such as velocity, acceleration and the like). To validate a control program for the servo control part, it is necessary to simulate the servo mechanism not on the task level but while dynamically analyzing a controlled variable such as the above mechanical position or the like (that is, on the servo level). When validation is made on the servo level, it is necessary to strictly simulate by dynamic analysis, which leads to difficulty in simulation in real time.

For this, it is desired to be able to develop and debug (validate) the servo control part (hereinafter referred to a servo control program, occasionally) of the control program for a product of a relatively small size and having rapid response without using an actual mechanism.

Meanwhile, there has been a general technique of modeling a controlled object and a control law for the controlled object, and validating the control law. This technique enables validation of the control law on the theoretical level, but cannot cope with various problems (execution speed, code size, consumed memory quantity, mixing of bugs and the like) occurring when the validated control law is coded into actual firmware (control program). Additionally, since this technique is for validation of a control law, this technique cannot validate a control program created on the basis of the control program. When the control program is validated, the above general technique is used after all.

SUMMARY OF THE INVENTION

In the light of the above problems, an object of the present invention is to provide a control program development support apparatus enabling development and debugging (validation) of a control program for controlling a relatively small product (mechanism) having rapid response without using an actual mechanism.

The present invention therefore provides a control program development support apparatus, in which a predetermined simulation cycle in a simulation unit is set shorter than a predetermined control cycle in a control program executing unit, the simulation unit simulates an operation of a mechanism in the predetermined simulation cycle for a time corresponding to the predetermined control cycle, and outputs a state variable of the mechanism to a holding unit, a simulation control unit makes the simulation unit shift to a state of waiting for a response from the control program execution unit and makes the control program execution unit initiate an operation of calculating a controlled variable according to the state variable when the state variable from the simulation unit is held in the holding unit, whereas making the control program execution unit shift to a state of waiting for a response from the simulation unit and making the simulation unit initiate a simulating operation according to the controlled variable when the controlled variable from the control program execution unit is held in the holding unit.

In the above control program development support apparatus according this invention, a mechanism (servo mechanism), that is a controlled object plant, is modeled, and the simulation unit for simulating an operation of the model and the control program execution unit for executing firmware controlling the operation of the mechanism (servo mechanism) are connected via the holding unit. The simulation control unit can synchronize an operation of the simulation unit with an operation of the control program execution unit, whereby precise simulation becomes possible while keeping time strictness. At that time, the simulation unit simulates in a simulation cycle shorter than a control cycle (servo cycle in servo control firmware) in the control program execution unit, thus execution of precise simulation becomes possible.

The control program development support apparatus may further comprise a synchronous setting means for performing synchronous setting of the simulation control unit. The synchronous setting means may be configured using a graphical user interface function. Whereby, synchronous setting between an operation of the simulation unit an operation of the control program execution unit may be performed. Further, the synchronous setting may be readily performed using graphic.

The control program execution unit may output a plurality of controlled variables to be inputted to the simulation unit at different timings during one control cycle, and the control program development support apparatus may further comprise a multi-rate control means for performing an input control on the plural controlled variables such that the controlled variables are inputted to the simulation unit at respective predetermined timings. At this time, the control program development support apparatus may still further comprise a multi-rate setting means for performing setting of the multi-rate control means, and the multi-rate setting means may be configured using a graphical user interface function.

The simulation unit can simulate the multi-rate control in which a controlled variable is changed during one control cycle by using the multi-rate control means. By means of the multi-rate setting means, it is possible to define and set the multi-rate control, and to readily set the multi-rate control by using graphic.

The simulation control unit may determine a timing, at which the control program execution unit starts calculating the controlled variable, on the basis of a result of simulation by the simulation unit. According to a result of simulation by the simulation unit, the process can shift to a servo control routine in the control program execution unit, so that it becomes possible to confirm a fail-safe function by a timer, or cope with a process of measuring a changed variable (velocity, rotation number, etc.) per unit time.

The model may be configured with a plurality of parts of which operations can be separately simulated, and the simulation unit may comprise a plurality of processors for simulating in parallel the operations of the plural parts. It is there by possible to execute simulation of parts of the model in parallel by the plural processors.

The holding unit may comprise a plurality of registers for temporarily holding data including the controlled variable to be transferred from the control program execution unit to the simulation unit and the state variable to be transferred from the simulation unit to the control program execution unit, a first write/read control unit for controlling writing/reading of the data between the plural registers and the control program execution unit, and a second write/read control unit for controlling writing/reading of the data between the plural registers and the simulation unit.

The controlled variable from the control program execution unit is temporarily written in an appropriate register by the first write/read control unit, after that, read out by the second write/read control unit and inputted to the simulation unit according to a synchronous signal. On the other hand, the state variable from the simulation unit is temporarily written in an appropriate register by the second write/read control unit, after that, read out by the first write/read control unit and inputted to the control program execution unit according to a synchronous signal (interrupt signal).

At this time, an interrupt signal, which is inputted to one of the plural registers from the simulation unit in order to make the control program execution unit initiate the operation of calculating the controlled variable, may be directly sent from the register to the control program execution unit without reference to the first write/read control unit. The control program execution unit's side can obtain the interrupt signal without performing a read control (reading operation by firmware) by the first write/read control unit, thus can perform synchronous processing using hardware interrupt.

The control program development support apparatus may still further comprise a data display unit for displaying data held in the plural registers. At this time, the control program development support apparatus may still further comprise a selecting unit for selecting at least one register selected from the plural registers to make the data display unit display data held in the selected register. Alternatively, the data display unit may be directly connected to a specific register among the plural registers to display data held in the specific register. Whereby, data being now communicated between the control program execution unit and the simulation unit can be displayed on the data display unit, the operator, for example, can refer and confirm the data.

The control program development support apparatus may still further comprise a data input unit for forcedly setting and storing desired data in at least one of the plural registers.

At this time, the data input unit may be directly connected to the specific register among the plural registers to set the desired data in the specific register from the data input unit. The operator, for example, writes arbitrary data from the data input unit into the register to directly input the data in the control program execution unit or the simulation unit. Accordingly, the operator can confirm behavior of the control program or an operating state of the model according to the data.

The control program development support apparatus may still further comprise a noise superposing unit for superposing noise on data read out from at least one of the plural registers. The operator, for example, can superpose noise on data by the noise superposing unit to confirm behavior of the control program or an operation state of the model.

The control program development support apparatus according to this invention provides the following effects and advantages:

(1) By delaying the operating process in the control program execution unit to synchronize it with the model operating process (simulation) in the simulation unit, it becomes possible to simulate precisely as in slow motion while keeping time strictness without changing the characteristic (servo characteristic) of the mechanism. It is therefore possible to develop and debug (validate) the control program for a relatively small product having rapid response without using an actual mechanism.

(2) It is possible to readily create a model having an arbitrary characteristic and control by the control program only by changing parameters. It is therefore possible to validate how much the control program can cope with variations in product manufactured in large volume, that is, to certainly validate a quality of the control program.

(3) Simulation using a virtual model enables use of functions such as step debugging and the like, and easy development of the control product. It is also possible to simply validate a new control method using a new actuator or sensor.

(4) The operator, for example, can readily and arbitrarily perform the synchronous setting between the operation of the simulation unit and the operation of the control program execution unit by using the synchronous setting means (GUI function).

(5) Since the multi-rate control, in which a controlled variable is changed during one control cycle, is simulated by using the multi-rate control means, it is possible to certainly cope with a case where the servo logic realizes the multi-rate control. At this time, the operator, for example, can readily and arbitrarily define and set the multi-rate control using the multi-rate setting means (GUI function).

(6) The process can be shifted to the control routine in the control program execution unit according to a result of simulation by the simulation unit. Accordingly, various functions such as confirming the fail-safe function by a timer, coping with a process of measuring a changed variable (velocity, rotation number, etc.) per unit time and the like are realized so that development and debugging (validation) of the control program can be certainly supported.

(7) Since simulation of operations of the structure of a model can be carried out in parallel by plural processors, the simulating process can be largely sped up.

(8) Since the holding unit is configured with the plural registers, the first write/read control unit and the second write/read control unit, a controlled variable from the control program execution unit and a state variable from the simulation unit can be temporarily held in the registers, and certainly transferred to the simulation unit and the control program executing unit, respectively.

(9) Since the control program execution unit's side can obtain an interrupt signal without performing the read control by the first write/read control unit, the synchronous processing using hardware interrupt becomes possible. The control program execution unit can thereby immediately and certainly initiate an operation of calculating a controlled variable, according to the interrupt signal.

(10) The operator, for example, can refer and confirm data owing to the data display unit displaying the data being now communicated between the control program execution unit and the simulation unit. It is thereby possible to certainly support development and debugging (validation) of the control program.

(11) The operator, for example, can write arbitrary data from the data input unit into the register to directly input the data to the control program execution unit or the simulation unit. The operator can thereby confirm behavior of the control program or an operating state of the model according to the data, thus development and debugging (validation) of the control program is certainly supported.

(12) The operator, for example, can superpose noise on data by the noise superposing unit. The operator can thereby confirm behavior of the control program or an operating state of the model according to the noise, thus development and debugging (validation) of the control program is certainly supported.

BRIEF DESCRIPTION OF THE DRAWINGS

FIG. 1A is a block diagram showing the structure of the general system; FIG. 1B is a block diagram showing the structure according to the embodiment;

FIG. 13 is a flowchart for illustrating a procedure for initial setting prior to the multi-rate setting according to the embodiment;

FIG. 20 is a block diagram showing a structure of a holding circuit having a function of superposing noise on data from a register.

DESCRIPTION OF THE PREFERRED EMBODIMENTS

Hereinafter, description will be made of embodiments of the present invention with reference to the drawings.

[1] Description of an Embodiment of the Invention

[1—1] Whole structure of the Embodiment

Figure 1:
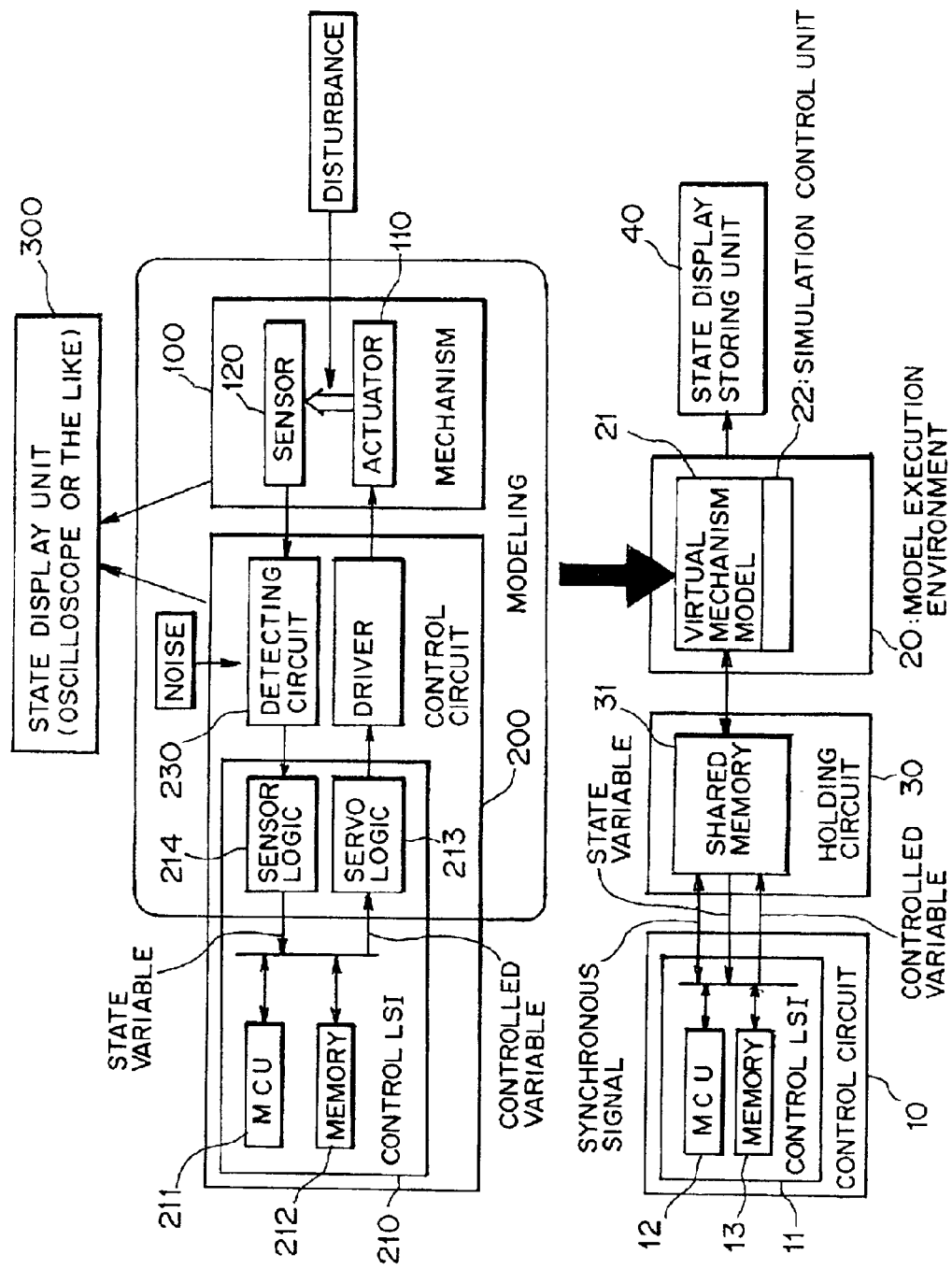
FIGS. 1A and 1B depict a structure of a control program development support apparatus according to an embodiment of this invention by comparing a structure of a general system.

FIGS. 1A and 1B show a structure of a control program development support apparatus according to an embodiment of this invention, comparing with a structure of a general system. FIG. 1A is a block diagram showing a structure of a general system, whereas FIG. 1B is a block diagram showing a structure according to the embodiment.

As shown in FIG. 1A, the general system for development and debugging (validation) of a servo control program uses an actual servo mechanism, that is, an actual mechanism 100 and an actual control circuit 200.

The mechanism 100 comprises an actuator 110 and a sensor 120. The actuator 110 controls an operation of the mechanism 100 according to a controlled variable from the control circuit 200. The sensor 120 detects an operating state of the mechanism 100 controlled by the actuator 110 and receiving disturbance as a state variable.

The control circuit 200 comprises a control LSI 210, a driver 220 and a detecting circuit 230.

The control LSI 210 executes a control program (a servo control part of the control program/firmware) controlling an operation of a servo mechanism, which comprises an MCU (MicroController Unit) 211, a memory 212, a servo logic 213 and a sensor logic 214.

The memory 212 stores various information including the above control program. The MCU 211 is a so-called one-chip microcomputer, which executes the control program stored in the memory 212 to compute a controlled variable for the mechanism 100 (servo mechanism) according to a state variable (a result of detection by the sensor 120) from the side of the mechanism 100.

The servo logic 213 and the sensor logic 214 are connected to the driver 220 and the detecting circuit 230, respectively, each of which comprises general logic circuits such as an A/D (Analog/Digital converter), a D/A (Digital/Analog converter), a PIO (Parallel Input/Output) and the like. As the servo logic 213, a pulse-width modulation (PWM) signal generator may be used.

The driver 220 drives the actuator on the basis of a control signal (controlled variable) from the servo logic 213. The detecting circuit 230 receives a state variable detected by the sensor 120 of the mechanism 100, and inputs it to the sensor logic 214.

Incidentally, states of the mechanism 100 and the control circuit 200 are displayed by a state display unit 300 such as an oscilloscope or the like.

In the above general system, the actual mechanism 100 and control circuit 200 are used, the MCU 211 performs a servo operation on the basis of information (a state variable detected by the sensor 120) obtained through the detecting circuit 230 and the sensor logic 214, and gives a controlled variable that is a result of the operation as a control signal to command the actuator 110 through the servo logic 213 and the driver 220, whereby a servo loop is configured.

On the other hand, the control program development support apparatus 1 according to this embodiment is configured by communicably connecting a control circuit 10 and a model execution environment 20 through a holding circuit 30, as shown in FIG. 1B. Each of the control circuit 10 and the model execution environment 20 is actually configured with a processor for firmware execution and a processor for model operation.

The control circuit 10 functions as a control program execution unit which executes a control program (hereinafter referred to as control firmware, occasionally) for controlling an operation of the servo mechanism, and calculates and outputs a controlled variable for the servo mechanism in a predetermined control cycle (interval of calling control routine) ΔT. The control circuit 10 comprises a control LSI 11 including an MCU 12 and a memory 13.

The memory 13 stores various information including the above control program. The MCU 12 is a so-called one-chip microcomputer, which executes the control program stored in the memory 13, and computes a controlled variable for the servo mechanism (a virtual mechanism model 21 to be described later in this embodiment) according to a state variable (a result of simulation) from the side of the model execution environment 20.

Inside the model execution environment (hereinafter referred to as a simulator, occasionally) 20, the servo mechanism is configured as a virtual model (virtual mechanism model) 21. The model execution environment 20 functions as a simulation unit which simulates an operation of the servo mechanism in a predetermined simulation cycle Δt while dynamically analyzing the operation of the servo mechanism by using the virtual mechanism model 21, thereby calculating and outputting a state variable of the servo mechanism.

The virtual mechanism model 21 is a model of the servo mechanism in the general system shown in FIG. 1A, that is, a portion including the servo logic 213, the driver 220, the mechanism 100 (including the actuator 110 and the sensor 120), the detecting circuit 230 and the sensor logic 214.

The holding circuit (holding unit) 30 is arranged between the control circuit 10 and the model execution environment 20, and comprises a shared memory (buffer, register) 31 temporarily storing and holding a controlled variable and a state variable in order to transfer the controlled variable from the control circuit 10 to the model execution environment 20 and the state variable from the model execution environment 20 to the control circuit 10. Detailed structure of the relay circuit 30 will be described later with reference to FIGS. 16 through 20.

A state display recording unit (data display unit) 40 displays and records a result of simulation by the model execution environment 20.

In the control program development support apparatus 1 according to this embodiment, the simulation cycle Δt is set shorter than the control cycle ΔT. The model execution environment 20 simulates in a predetermined simulation cycle ΔT for a time corresponding to a predetermined control cycle Δt, and outputs a state variable of the servo mechanism obtained in the simulation to the holding circuit 30.

The control program development support apparatus 1 according to this embodiment is provided with a simulation control unit (synchronous processing unit) 22 which performs synchronous processing to synchronize an operation of the control unit 10 with an operation of the model execution environment 20 as will be described later. The simulation control unit 22 is provided in the model execution environment 20 in FIG. 1B. Actually, the simulation control unit 22 is disposed extending over the control circuit 10 and the model execution environment 20, which is accomplished by software in a method to be described later with reference to FIGS. 2, 3, and 5 through 10.

Figure 2:
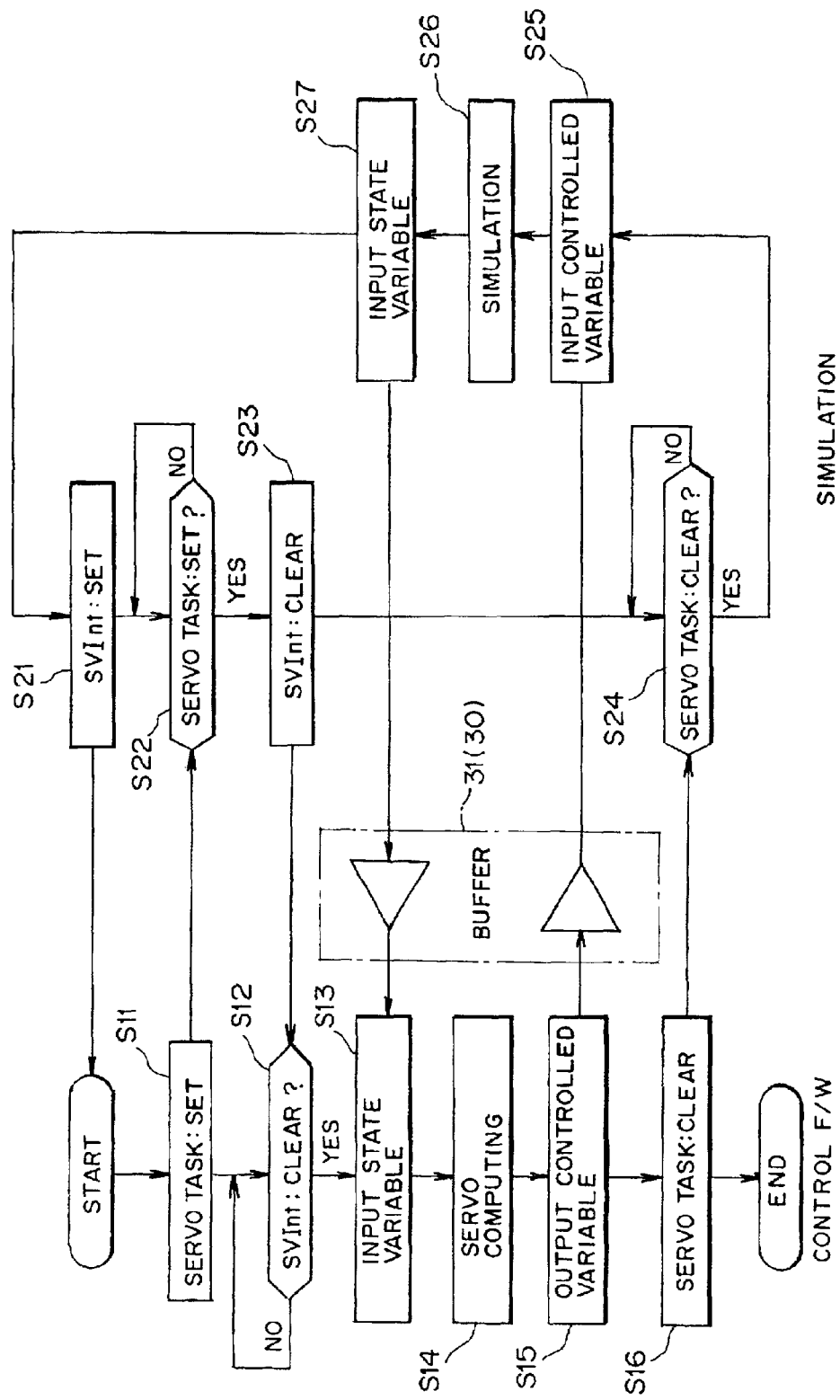
FIG. 2 is a flowchart for illustrating procedures for synchronous processing (an operation of a simulation control unit) according to the embodiment.
Figure 3:
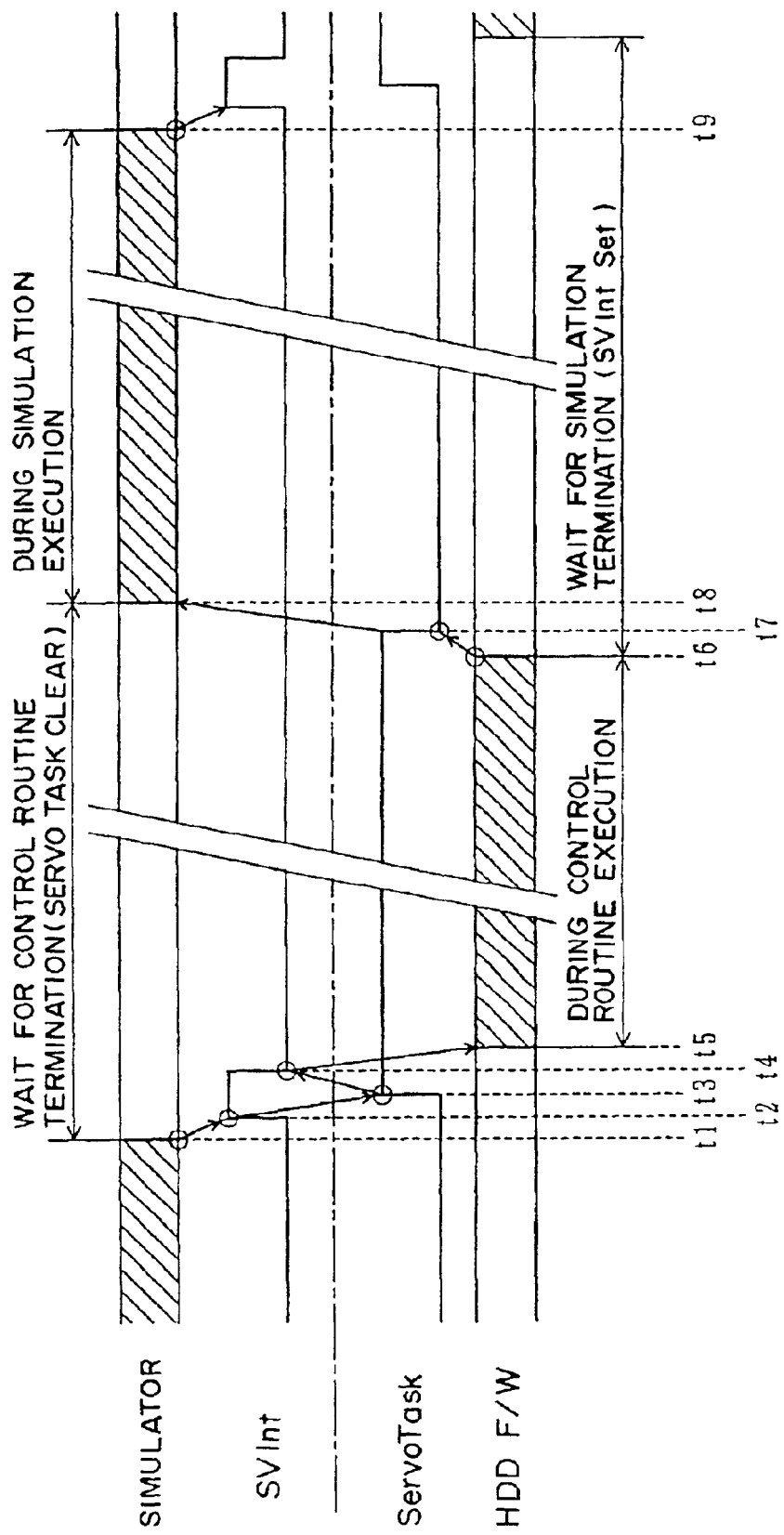
FIG. 3 is a time chart for illustrating the procedures for the synchronous processing (the operation of the simulation control unit) according to the embodiment.

When a state variable from the model execution environment 20 is held in the shared memory 31 in the holding circuit 30, the simulation control unit 22 such functions as to make the model execution environment 20 shift to a state of waiting for a response from the control circuit 10, and to make the control unit 10 initiate an operation of calculating a controlled variable according to the state variable. When a controlled variable from the control circuit 10 is held in the holding circuit 30, the simulation control unit 22 such functions as to make the control circuit 10 shift to a state of waiting for a response from the model execution environment 20, and to make the model execution environment 20 initiate a simulating operation according to the controlled variable. On that occasion, a servo interrupt signal (SVInt: Servo Interrupt) and a servo task signal (Servo Task) are exchanged between the control circuit (control firmware) 10 and the model execution environment (simulator) 20, as shown in FIGS. 2 and 3.

In the control program development support apparatus 1 according to this embodiment shown in FIG. 1B, portions other than portions (including supplementary circuits such as a floating-point operating unit and the like although not shown in FIG. 1B) such as the MCU 12 and the memory 13 required to operate the control program are all modeled, the model execution environment (simulator) 20 simulates an operation of the modeled virtual mechanism model 21, and a state variable of the virtual mechanism model 21 is calculated. The model execution environment 20 and the control circuit 10 communicate via the shared memory 31 of the holding circuit 30, whereby a servo loop is configured.

When it becomes necessary to shorten a sampling interval Δt of model execution (simulation) due to speed-up of response of the mechanism that is the object or when a calculation quantity increases due to more refinement of the model 21, it is difficult for the simulator 20 to compute the model in real time.

For this, in the control program development support apparatus 1 according to this embodiment, the operation of the MCU 12 is delayed to synchronize the operation of the MCU 12 with the operation of the virtual mechanism model 21 using a synchronous signal (servo interrupt signal) SVInt, whereby the simulation is performed as in slow motion without changing the servo characteristics. In this embodiment, a method coping with a case where the servo logic 213 accomplishes the multi-rate control will be described later with reference to FIGS. 11 through 13.

[1-2] Basic Synchronous Processing Procedure

Next, an operation (synchronous processing procedure) of the above simulation control unit (synchronous processing unit) 22 according to this embodiment will be described with reference to FIGS. 2 and 3. FIGS. 2 and 3 are a flowchart and a time chart, respectively, for illustrating a synchronous processing procedure (operation of the simulation control unit 22) according to this embodiment.

Control firmware (control F/W portion; control program executed by the control circuit 10) shown in FIG. 2 is a servo control routine portion. The control firmware is generally called at a predetermined interval (ΔT) by a timer interrupt, or called by an interrupt signal generated when a servo mark is read out from a magnetic disk if the controlled object is the magnetic disk drive (HDD).

In the control program development support apparatus 1 according to this embodiment, an interrupt factor to call the servo control routine is altered to an interrupt signal (SVInt) issued from the side of the simulator 20, and the servo control routine is called when simulation by the simulator 20 is terminated (completion of model execution at a predetermined interval).

It is alternatively possible to always monitor a state of SVInt in the simulator 20 in the main loop without using the interrupt signal. As will be described later, it is thereby possible to execute the control routine and simulation alternately.

In the control firmware (control circuit 10) a process at steps S11 to S16 is executed according to an interrupt signal (SVInt) from the simulator 20, whereas a process at steps S21 to S27 is executed in the simulator 20 according to a servo task signal from the control circuit 10, as shown in FIG. 2. Whereby, the synchronous processing according to this embodiment is accomplished, thus an operation of the control circuit 10 is synchronized with an operation of the simulator 20.

Concretely, when an interrupt signal SVInt is set in the simulator 20 (step S21), the control firmware is activated and a servo task signal is set in the control circuit 10 (step S11).

The servo task signal is notified to the simulator 20. When the simulator 20 detects setting of the servo task signal (YES route at step S22), the interrupt signal SVInt is cleared (step S23). After that, the simulator 20 is in a state of waiting for a termination of control routine (servo task signal clear) until the servo task signal from the control circuit 10 is cleared, that is, until the determination at step S24 becomes YES.

When the control circuit 10 detects clear of the interrupt signal SVInt (YES route at step S12), the control circuit 10 reads a state variable (a result of simulation by the simulator 20) held in the shared memory (register) 31 of the holding circuit 30 (step S13), and executes the servo operation, that is, an operating process for a controlled variable according to the state variable (step S14). The control circuit 10 outputs the calculated controlled variable to the holding circuit 30 to store it in the shared memory 31 (step S15), clears the servo task signal (step S16) and terminates the servo control routine.

On the other hand, when the simulator 20 detects clear of the servo task signal (YES route at step S24), the simulator 20 reads the controlled variable held in the shared memory (register) 31 of the holding circuit 30 (step S25), performs simulation (step S26), and executes the operating process for a state variable of the virtual mechanism model 21 according to the controlled variable. When the simulator 20 outputs the state variable obtained as a result of the simulation to the holding circuit 30 to store it in the shared memory 31 (step S27), the interrupt signal SVInt is again set (step S21), after that, the process similar to the above is repeated.

Next, the synchronous processing described above with reference to FIG. 2 will be described with reference to FIG. 3. As shown in FIG. 3, when the simulator 20 outputs the state variable at a time t1 and terminates the simulation (step S27), the simulator 20 shifts to the control routine termination (servo task signal clear) waiting state, and sets the interrupt signal SVInt at a time t2 (step S21) to call the control firmware to activate it.

When the control circuit 10 sets the servo task signal at a time t3 (step S11), the simulator 20 clears the interrupt signal SVInt at a time t4 in response to the servo task signal (step S23), so that the control firmware (HDD F/W) gets into a state where the control routine is being executed from a time t5 (steps S13 to S15).

After that, when the control firmware outputs the controlled variable at a time t6 and terminates the servo operation (step S15), the control firmware shifts to a simulation termination (SVInt set) waiting state, and clears the servo task signal at a time t7 (step S16). With this, the simulator 20 gets into a state where the simulation is being executed from a time t8 (steps S25 to S27). When the simulator 20 outputs the state variable at a time t9 and terminates the simulation (step S27),the above-described process is repeated.

[1-3] Relation Between Control Cycle and Simulation Cycle

Assuming that the control cycle, which is an interval at which the control routine is called, is $\Delta T$, the simulation (model execution) by the simulator 20 is heretofore carried out at the same interval $\Delta T$ as the control cycle. In order to carry out accurate simulation or to cope with a multi-rate control or the like to be described later, it is necessary to shorten the simulation interval (simulation cycle) $\Delta t$ than the control cycle $\Delta T$.

The control program development support apparatus 1 according to this embodiment adds $\Delta t$ each time the simulation for the simulation cycle $\Delta t$ is executed in the simulation execution part in FIG. 2 (step S26), and gets out from the simulation loop when the total time reaches the control cycle $\Delta T$.

Figure 4:
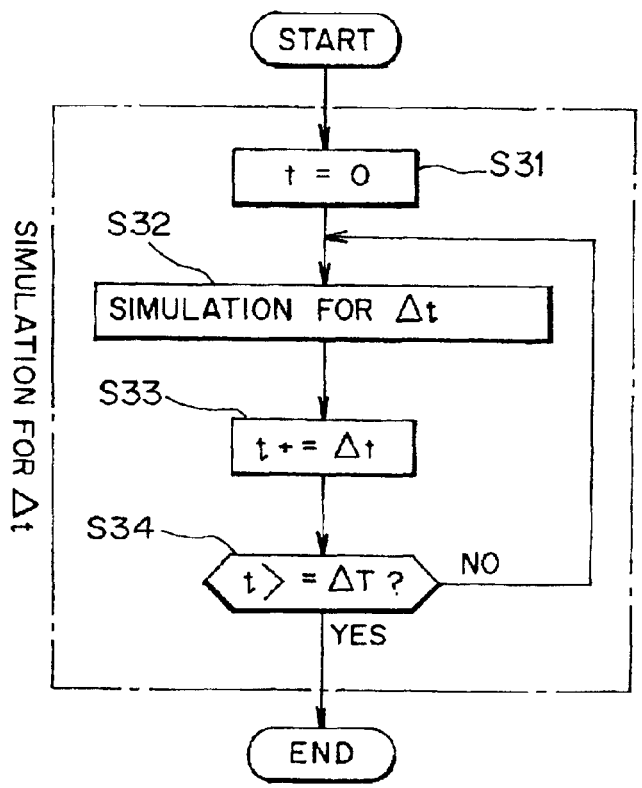
FIG. 4 is a flowchart for illustrating a simulation principle in a simulator according to the embodiment.

More concretely, FIG. 4 is a flowchart (steps S31 to S34) for illustrating a simulation principle in the simulator according to this embodiment. As shown in FIG. 4, in a part in which the simulation is executed shown in FIG. 2 (step S26), the total time t is set to zero (step S31) before the simulation is initiated. After that, in the simulator 20, the simulation cycle $\Delta t$ is added to the total time t (step S33) each time the simulation for a time corresponding to the simulation interval $\Delta t$ is executed (step S32), and it is determined whether the total time reaches the control cycle $\Delta T$ or not (step S34). When the total time is less than $\Delta T$ (NO route at Step S34), the procedure returns to step S32. When the total time t is equal to or larger than $\Delta T$ (YES route at step S34), the simulation is terminated.

[1-4] Basic Synchronous Setting

The simulator 20 of the control program development support apparatus 1 according to this embodiment has a function [a synchronous setting means for performing synchronous setting of the simulation control unit (synchronous processing unit)] for setting the above cycle $\Delta T$. This function is accomplished using a graphical user interface function (GUI function) in the simulator 20. Namely, the operator, for example, operates a keyboard, a mouse or the like while referring to a display on a display (not shown) in the simulator 20 to set the cycle $\Delta T$ (synchronous setting). According to this embodiment, a simple model (block diagram) is graphically described and created on the display in a general model describing method [for example, MATLAB/Simulink (MathWorks Company)], whereby the synchronous setting is done.

Figure 5:
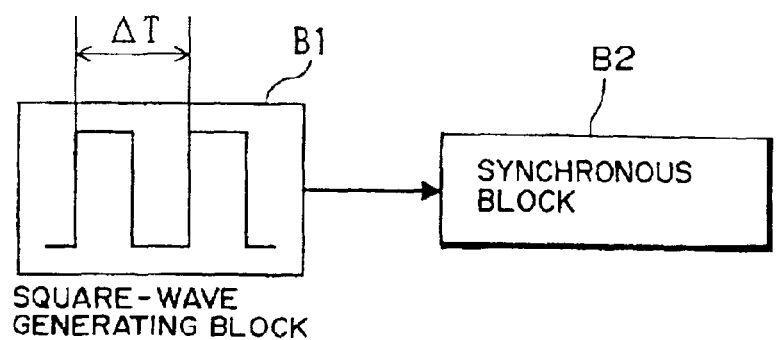
FIG. 5 is a diagram showing a model description level (a display state on a display) for synchronous setting according to the embodiment.
Figure 6:
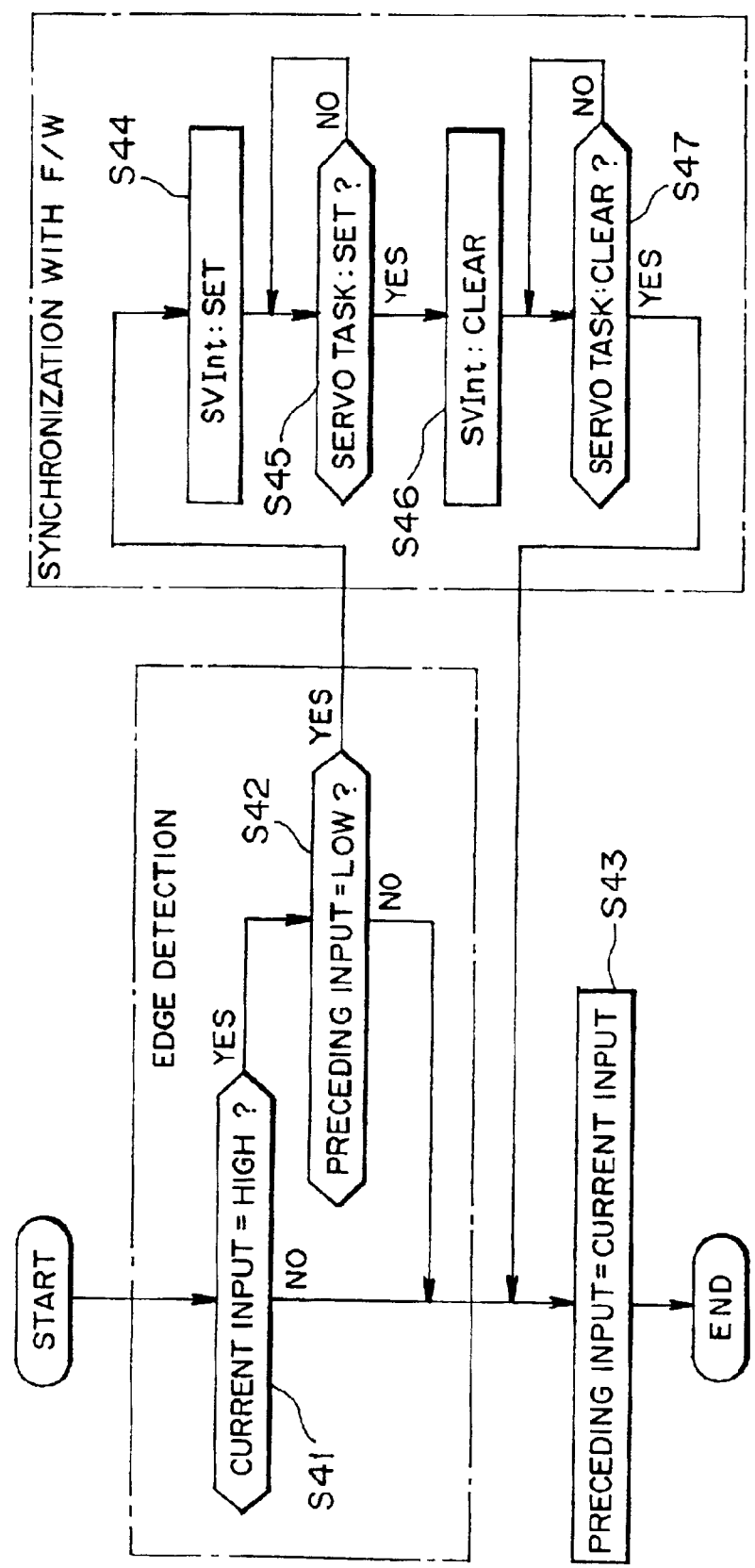
FIG. 6 is a flowchart for illustrating an operation of a synchronous block described and set on the model description level shown in FIG. 5.

FIG. 5 is a diagram showing a model description level (a display state on the display) for performing synchronous setting in this embodiment. FIG. 6 is a flowchart for illustrating an operation of a synchronous block B2 described and set on the model description level shown in FIG. 5.

According to this embodiment, a square-wave generating block B1 generating a square wave (pulse) in a constant cycle $\Delta T$ and the synchronous block B2 are created on the model description level shown in FIG. 5, and the block B1 and the block B2 are such described that a pulse from the square-wave generating block B1 is inputted to the synchronous block B2.

The synchronous block (synchronous processing unit, simulation control unit 22) B2 detects an edge (rise) of a pulse from the square-wave generating block B1, and performs the synchronous processing with the control firmware by using the edge as a trigger.

Now, an operation of the synchronous block B2 will be concretely described with reference to the flowchart (steps S41 to S47) shown in FIG. 6. In FIG. 6, steps S41 and S42 are a portion in which the edge is detected (rise of the pulse is detected), and steps S44 to S47 are a portion in which synchronization with the control firmware is done, and are corresponding to steps S21 to S24 in FIG. 2.

The synchronous block B2 is activated in each simulation cycle $\Delta t$. Each time the synchronous block B2 is activated, the synchronous block B2 determines whether a current input (a pulse from the square-wave generating block B1) to the synchronous block B2 is "High" or not (step S41). When the current input is not "High", that is, when the current input is "Low", (NO route at Step S41), the synchronous block B2 replaces the current input "Low" with a preceding input (step S43), and terminates the process.

When the current input is "High" (YES route at Step S41), the synchronous block B2 determines whether the preceding input is "Low" (step S42). When the preceding input is not "Low", that is, when the preceding input is "High" (NO route at step S42), the synchronous block B2 replaces the current input "High" with the preceding input (step S43), and terminates the process.

When it is determined at step S42 that the preceding input is "Low" (YES route at step S42), it means that a leading edge of the pulse from the square-wave generating block B1 is detected. With the detection of the leading edge as a trigger, the synchronous block B2 shifts to the synchronous process (steps S44 to S47) with the control firmware.

The synchronous process (steps S44 to S47) corresponds to the process at steps S21 to S24 described with reference to FIG. 2, description of which is thus omitted. When the servo task signal is cleared in the control firmware and the determination at step S47 is YES, the synchronous block B2 terminates the synchronous process, replaces the current input "High" with the preceding input (step S43), and terminates the process.

Although an error less than $\Delta t/2$ generates between the control cycle $\Delta T$ and a total time t obtained by adding the simulation cycle $\Delta t$ (refer to step S33 in FIG. 4), the simulation cycle $\Delta t$ can be arbitrarily set for the control cycle $\Delta T$. Incidentally, when the control cycle $\Delta T$ is a natural number multiple of the simulation cycle $\Delta t$, the above error is zero. When not, an error in a range from $-\Delta t/2$ to $\Delta t/2$ generates.

In the control program development support apparatus 1 according to this embodiment, the simulation control unit (synchronous processing unit) 22 may determine a start timing of the calculating operation of a controlled variable by the control circuit 10 (control firmware) on the basis of a result of simulation by the simulator 20. Instead of the square-wave block B1 shown in FIG. 5, a detection simulation result of a servo mark 50a as shown in FIG. 7, for example, is inputted to the synchronous block B2, whereby the interrupt signal SVInt is generated and outputted not in a constant cycle but according to another factor.

Figure 7:
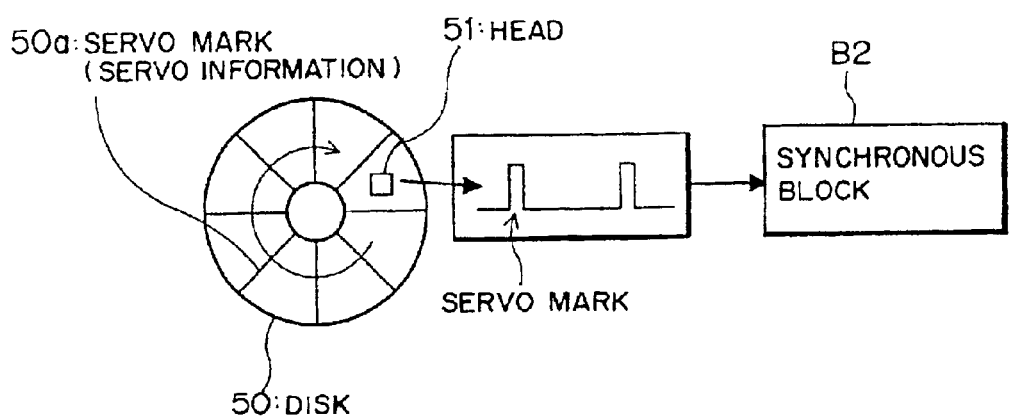
FIG. 7 is a diagram for illustrating a method for measuring a speed according to an interruption interval in the apparatus according to the embodiment.

In the example shown in FIG. 7, the simulator 20 simulates a state where the servo mark 50a in a disk 50 of the HDD is detected by a head 51. By measuring an interval of the interrupt signal SVInt generated as above on the control firmware's side, the control program development support apparatus 1 can cope with a process of measuring a velocity (rotation speed). In such case, it is necessary that the state variable includes information about an elapsed time.

The control program development support apparatus 1 according to this embodiment may intentionally removes a square wave for one pulse from square waves, which are cyclically inputted from the square-wave generating block B1 to the synchronous block B2, to input the square waves lacking one pulse to the synchronous block B2, thereby validating whether a fail-safe function by a timer in the control firmware certainly works or not.

[1-5] Synchronous Setting of Input/Output

Figure 8:
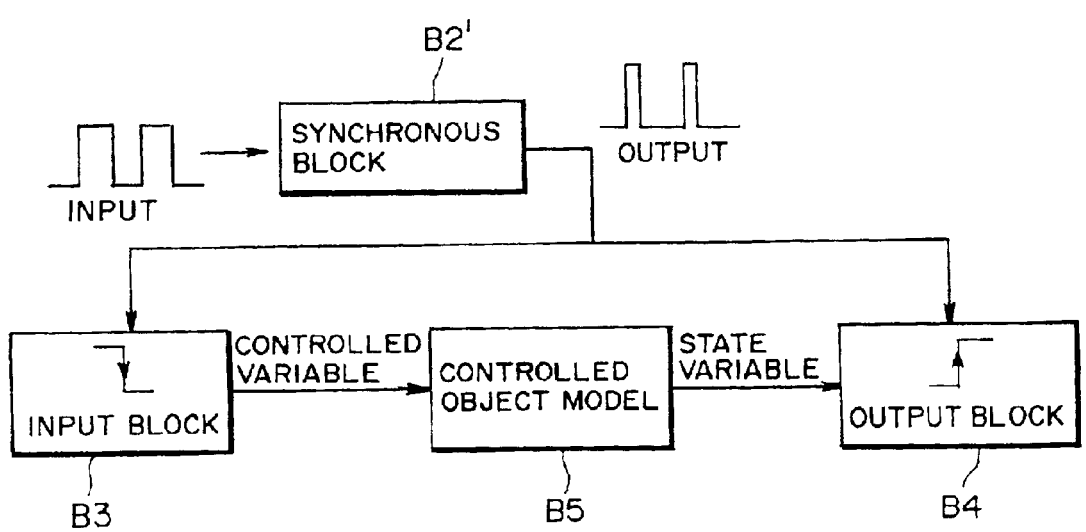
FIG. 8 is a diagram showing the model description level (a display state on the display) for the synchronous setting of an input/output according to the embodiment.
Figure 9:
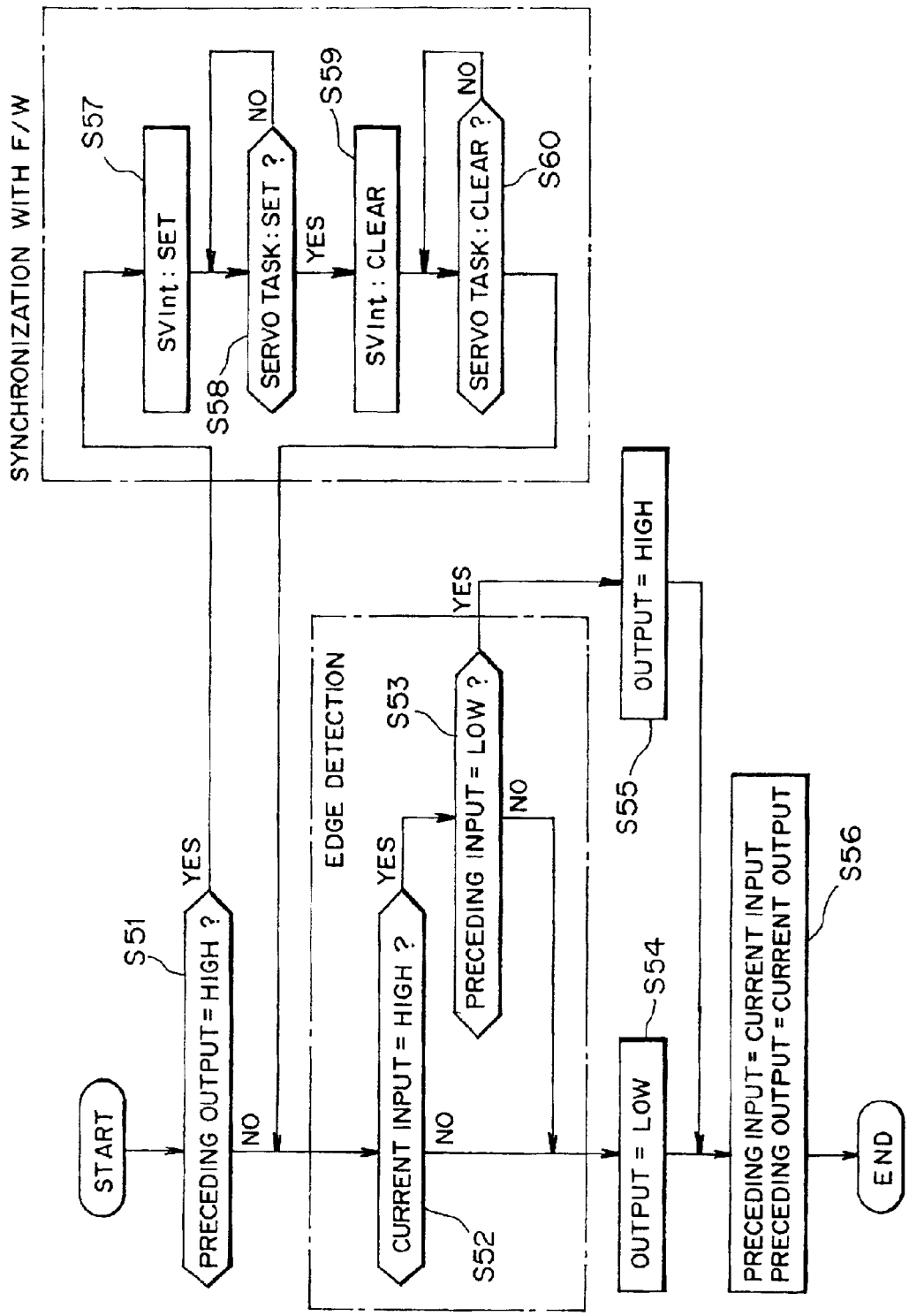
FIGS. 9 and 10 are flowcharts for illustrating an operation of the synchronous block described and set on the model description level shown in FIG. 8.
Figure 10:
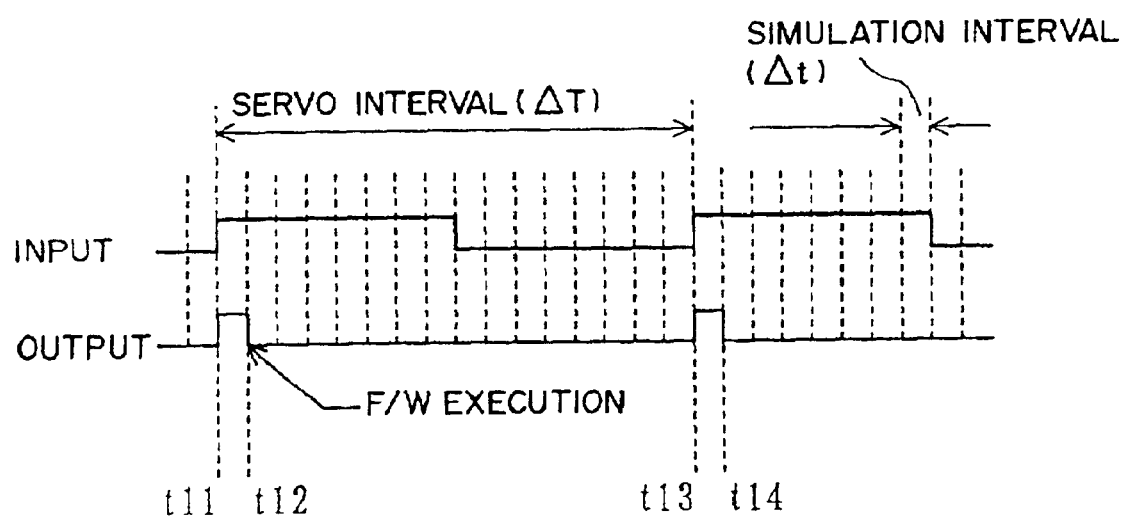

Next, synchronous setting of input/output according to this embodiment will be described with reference to FIGS. 8 through 10. FIG. 8 is a diagram showing the model description level (a display state on the display) for performing synchronous setting of input/output in this embodiment. FIGS. 9 and 10 are a flowchart and a time chart, respectively, for illustrating an operation of a synchronous block B2' described and set on the model description level shown in FIG. 8.

In the synchronous processing procedure shown in FIG. 2, the virtual mechanism model 21 has to read a controlled variable from the control circuit 10 before executing simulation, and output a state variable after executing the simulation. According to this embodiment, such synchronous timings for input/output can be set by graphically describing and creating a simple model (block diagram) as shown in FIG. 8 on the display in the general model describing method [for example, MATLAB/Simulink (MathWorks Inc.)].

An output of the synchronous block B2' on the model description level shown in FIG. 8 reacts to a leading edge of an input pulse to the synchronous block B2', and becomes "High" during one simulation cycle ($\Delta t$). In this embodiment, an output block B4 is described and created such that a state variable is outputted from a controlled object model B5 (simulator 20) by using a timing, at which an output of the synchronous block B2' becomes "High", as a trigger, as shown in FIG. 8. On the other hand, an input block B3 is described and created such that a controlled variable is inputted to the controlled object model B5 (simulator 20) by using a timing, at which an output of the synchronous block B2' becomes "Low", as a trigger, so that the input/output timings are defined.

The operation of the synchronous block B2' described above will be next concretely described with reference to the flowchart (steps S51 to S60) shown in FIG. 9. Incidentally, steps S52 and S53 in FIG. 9 are a portion in which an edge is detected (pulse rise is detected), similarly to steps S41 and S42 in FIG. 6. Steps S57 to S60 are a portion in which synchronization with the control firmware is done, and are corresponding to steps S21 to S24 in FIG. 2.

The synchronous block (synchronous processing unit, simulation control unit 22) B2' is activated in each simulation cycle $\Delta t$. Each time the synchronous block B2' is activated, it is determined whether the preceding output from the synchronous block B2' is "High" or not (step S51). When the preceding output is not "High", that is, when the preceding output is "Low" (NO route at step S51), it is determined whether the current input to the synchronous block B2' is "High" or not (step S52). When the current input is not "High", that is, when the current input is "Low" (NO route at step S52), an output from the synchronous block 2' is made "Low" (step S54). After that, the current input is replaced with the preceding input, and the current output is replaced with the preceding output (step S56), then the process is terminated.

When the current input is "High" (YES route at step S52), it is determined whether the preceding input is "Low" or not (step S53). When the preceding input is not "Low", that is, when the preceding input is "High" (NO route at step S53), steps S54 and S56 described above are executed, and the process is terminated.

When it is determined at step S53 that the preceding input is "Low" (YES route at step S53), it means that a leading edge of the input pulse to the synchronous block B2' is detected. With detection of the leading edge as a trigger, an output from the synchronous block B2' is made "High" (step S55). Then, the current input is replaced with the preceding input and the current output is replaced with the preceding output (step S56), and the process is terminated.

When it is determined at step S51 that the preceding output is "High" (YES route at step S51), the procedure shifts to the synchronous process with the control firmware (step S57 to S60). The synchronous process (steps S57 to S60) corresponds to the process at steps S21 to S24 described above with reference to FIG. 2, description of which is thus omitted. When the servo task signal is cleared in the control firmware and determination at step S60 is YES, the synchronous process is terminated, and the procedure proceeds to step S52.

Next, the process at the synchronous step B2' described above with reference to FIG. 9 will be described with reference to FIG. 10. As indicated at simulation times from t11 to t12 and from t13 to t14 in FIG. 10, an output of the synchronous block B2' reacts to a leading edge of an input pulse to the synchronous block B2' (YES route at step S53), and becomes "High" during one simulation cycle (simulation interval) $\Delta t$ in each control cycle (servo interval) $\Delta T$ (step S55). At times other than the above, the output of the synchronous block B2' is always "Low" (step S54).

With that the preceding output of the synchronous block B2' being "High" as a trigger (namely, immediately before an output pulse of the synchronous block B2' falls), the simulator 20 shifts to the synchronous process at steps S57 to S60, and gets into a servo task signal clear waiting state. At simulation times t12 and t14 in FIG. 10, the simulator 20 gets in a state where the simulator 20 stops simulation. When the servo task signal is cleared (YES route at step S60), the simulation by the simulator 20 is resumed.

The input block B3 functions in response to fall of the output pulse of the synchronous block B2', so that a controlled variable from the control firmware is inputted to the controlled object model B5 (virtual mechanism model 21). In response to rise of the output pulse of the synchronous block B2', the output block B4 functions so as to output a state variable of the controlled object model B5 (virtual mechanism model 21).

[1-6] Method for Coping with Multi-Rate Control

Figure 11:
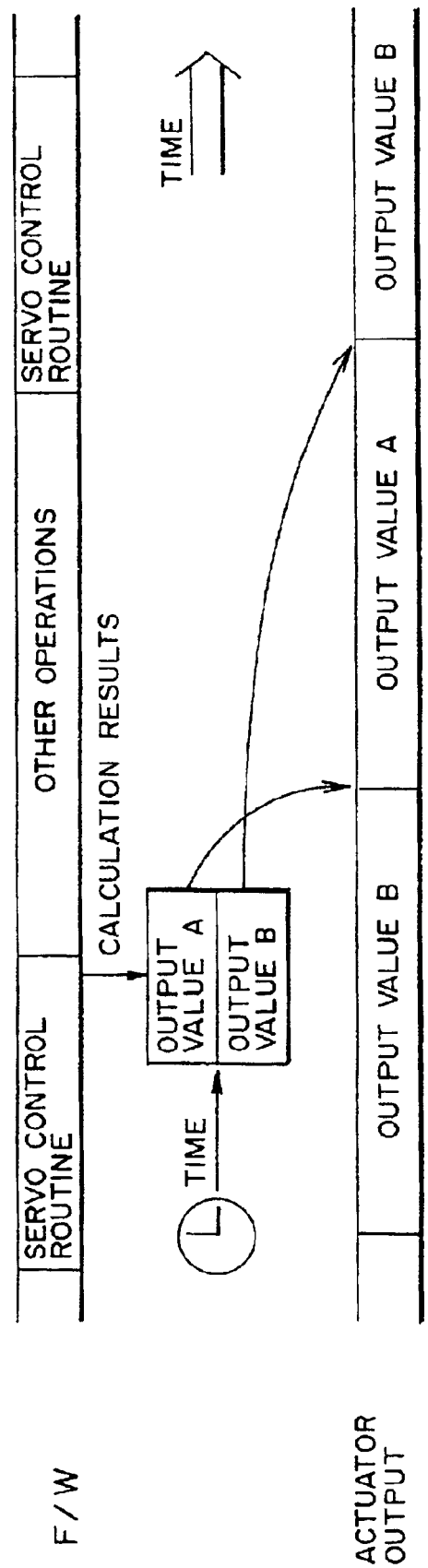
FIG. 11 is a diagram for illustrating a multi-rate control according to the embodiment.
Figure 12:
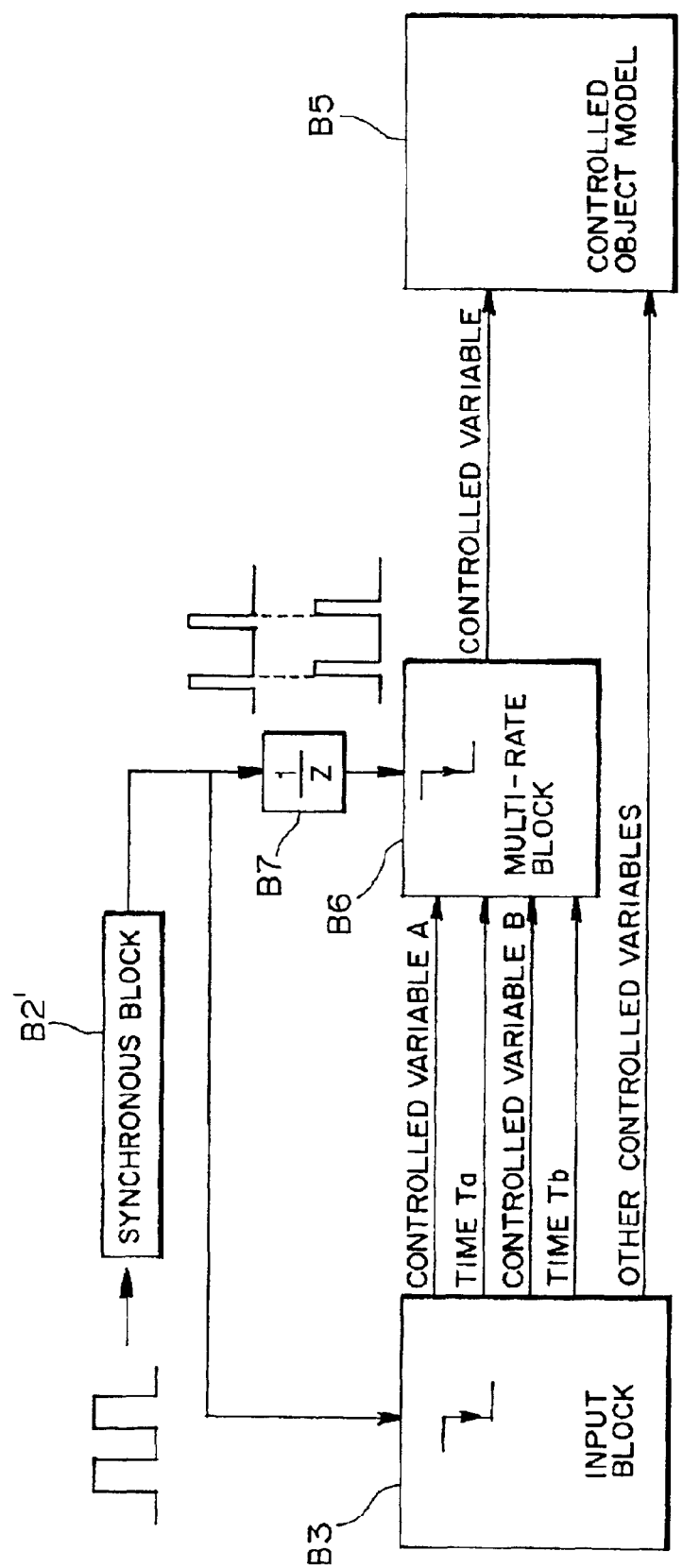
FIG. 12 is a diagram showing a model description level (a display state on the display) for multi-rate setting according to the embodiment.
Figure 14:
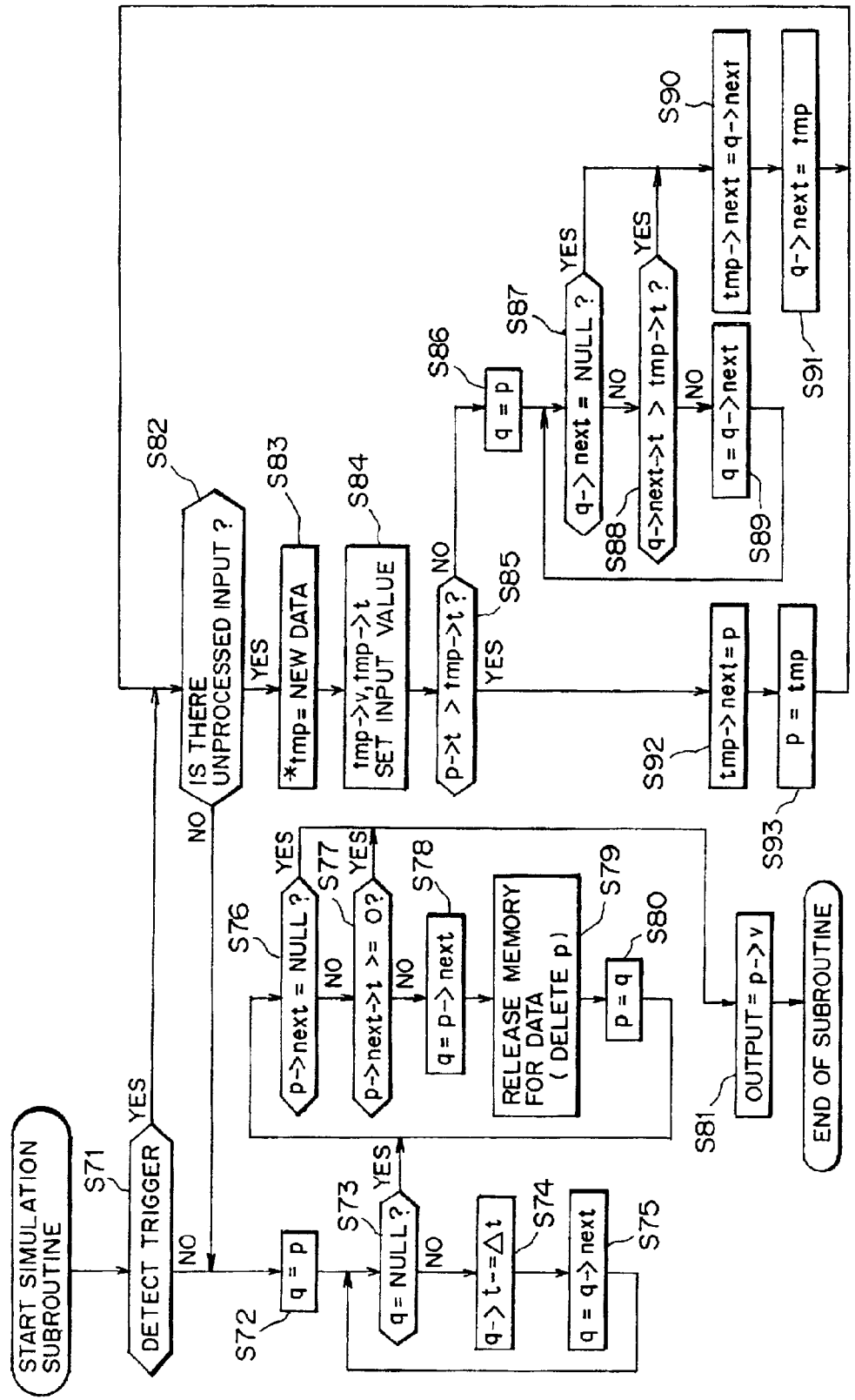
FIG. 14 is a flowchart for illustrating the procedure for the multi-rate control (an operation of a multi-rate block set on the model description level shown in FIG. 12) according to the embodiment.

Next, a method for coping with a multi-rate control in the control program development support apparatus 1 according to this embodiment will be described with reference to FIGS. 11 through 14. FIG. 11 is a diagram for illustrating the multi-rate control according to this embodiment. FIG. 12 is a diagram showing a model description level (a display state on the display) for performing multi-rate setting according to this embodiment. FIG. 13 is a flowchart for illustrating an initial setting procedure prior to the multi-rate control according to this embodiment. FIG. 14 is flowchart for illustrating a multi-rate control procedure (operation of a multi-rate block B6 set on the model description level shown in FIG. 12) according to this embodiment.

There is a case where the control firmware (F/W) does not immediately output a controlled variable calculated in the servo control routine to the actuator, but outputs it using a suitable circuit after a predetermined time is elapsed. As shown in FIG. 11, for example, the control firmware may perform a control such as to change an output value (controlled variable) to the actuator from "A" to "B" during the servo control routine (one control cycle). Such control is called a multi-rate control. By employing the multi-rate control, the control circuit 10 (servo control program, control firmware) can output a plurality of controlled variables to the simulator 20 (virtual mechanism model 21) at different timings during one control cycle.

The control program development support apparatus 1 according to this embodiment can cope with when the servo control program employs the above multi-rate control. For this, the simulator 20 of the control program development support apparatus 1 is provided with a multi-rate control means. The multi-rate control means performs an input control on controlled variables such as to input a plurality of controlled variables from the control circuit 10 to the virtual mechanism model 21 (controlled object model B5) at respective predetermined timings. The multi-rate control means is realized with a multi-rate block B6 described and set as shown in FIG. 12.

In order that the apparatus 1 according to this embodiment can cope with the multi-rate control, times (for example, Ta and Tb) corresponding to timings, at which controlled variables (for example, A and B) are outputted from the firmware, together with the controlled variables are inputted, as shown in FIGS. 11 and 12. When the times are fixed, the times may be designated in the virtual mechanism model 21.

The simulator 20 of the control program development support apparatus 1 according to this embodiment has a function (multi-rate setting means) for setting the above multi-rate control means. This function is realized with a graphical user interface function (GUI function) in the simulator 20. Namely, the operator, for example, operates a keyboard, a mouse or the like while referring to a display on the display (not shown) in the simulator 20, thereby setting the multi-rate control means. According to this embodiment, a simple model (block diagram) is graphically described and created on the display in the general model describing method [for example, MATLAB/Simulink (MatchWorks Inc.)], as shown in FIG. 12, whereby the multi-rate control means is set.

In the example shown in FIG. 12, an input block B3, a controlled object model B5, a multi-rate block B6 and a delay block (1/Z) B7 are described along with a synchronous block B2' similar to that shown in FIG. 8. An output of the synchronous block B2' is inputted to the input block B3, and also inputted to the multi-rate block B6 via the delay block B7.

The multi-rate block B6 is described between the input block B3 and the controlled object model B5. Controlled variables A and B relating to the multi-rate control from the input block B3 are inputted to the multi-rate block B6 along with respective output timings (times Ta and Tb), then inputted from the multi-rate block B6 to the controlled object model B5 at a predetermined output timing. Controlled variables other than the multi-rate control are directly inputted from the input block B3 to the control object model B5.

Why the delay block B7 of 1/Z is described in FIG. 12 is to delay a control pulse (output pulse) from the synchronous block B2' by one simulation cycle $\Delta t$. Namely, by the delayblock B7, the control pulse is inputted to the multi-rate block B6 when one simulation cycle $\Delta t$ elapses after the control pulse is inputted to the input block B3. The input block B3 and the multi-rate block B6 are both activated by using a trailing edge of a control pulse from the synchronous block B2' as a trigger.

By performing the above delaying process, a process by the multi-rate block B6 is always executed after a process by the input block B3 is executed. Namely, after the input block B3 certainly receives a command (controlled variable, times) from the control circuit 10 (firmware), the multi-rate block B6 executes the multi-rate control.

Strictly speaking, when the control pulse delayed by 1/Z is given to the multi-rate block B6, the multi-rate control is delayed by $\Delta t$. However, when the simulation cycle $\Delta t$ is remarkably shorter than the control cycle $\Delta T$, a delay as the above $\Delta t$ can be ignored. When strictness is desired or when the simulation cycle $\Delta t$ is a little shorter than the control cycle $\Delta T$, $\Delta t$ may be subtracted from the time Ta or Tb in the multi-rate block B6 to be used.

In FIG. 12, the delay block B7 is separately described from the multi-rate block B6. However, the similar process to that carried out within the delay block B7 may be carried out in the multi-rate block B6. In such case, description of the delay block B7 may be omitted. In this embodiment, the multi-rate control (controlled variables A and B) in two stages is described. However, this invention is not limited to this number of stages, but may be applied to the multi-rate control in three or more stages in the similar principle.

An operation of the above multi-rate block B6 will be now concretely described with reference to the flowchart (steps S71 to S93) shown in FIG. 14.

An initial setting process is executed in prior to the multi-rate control. First, a procedure for the initial setting process will be described with reference to the flowchart (steps S61 to S64) shown in FIG. 13. In the simulator 20, a memory for data is secured (*p=new Data; step S61), an initial output value (p->V=0) is set (step S62), and an initial output time (p->t=0) is set (step S63). Further, an initial value for list structure (p->next=NULL) is set (step S64).

Next, an operation of the multi-rate block B6 will be described with reference to FIG. 14.

In FIGS. 13 and 14, "->" indicates an operator for accessing to a structure or class member in C language or C++ language.

The structure or class data has three members; a controlled variable "v", a time "t" to output the controlled variable, and a pointer "next" to the next data.

Further, a variable "p" is retained in the following state (data type):

p->v: output when p->t (controlled variable)
p->t: time to output p->v
p->next: the next pointer p->next->v
p->next->t p->next->next: p->next->next->v
p->next->next->t
p->next->next->next: . . .

As above, the list structure is configured using the member "next", and any number of a combination of t and v are stored. Data, to which "NULL" is set as "next", is the last (end) data of the list structure.

Hereinafter, the operation of the multi-rate block B6 will be described with reference to FIG. 14 in the case where Δt=1 and data in the following list structure is set, for example.
p->v=−1
P->t=−1
p->next=P1
P1->v=2 (=p->next->v)
P1->t=1
P1->next=P2
P2->v=4 (=P1->next->v=p->next->next->v)
P2->t=3
P2->next=NULL A simulation subroutine shown in FIG. 14 is called and executed at each simulation cycle Δt, and first determines whether a trigger (trailing edge of a control pulse from the delay block B7) is detected or not (step S71).

When the trigger is not detected (NO route at step S71), a process in items (1) to (4) below is executed.

(1) q←p,q->t (=p->t)←−2
(2) q←q->next (=P1),q->t(=P1->t)←0
(3) q←q->next (=P2), q->t (=P2->t)←2
(4) q←q->next(=NULL), since q is NULL, the process gets out from the loop.

Here, (1) is a result of a shift from NO route at step s73 to step S74 after step S72. (2) and (3) are results of a shift from NO route at step S73 to step S74 after step S75. (4) represents that the process gets out from the loop of steps S73 to S75 through YES route at step S73, after step S75.

Since "p->next" is not "NULL" but "P1" (NO route at step S76), and "p->next->t" is "0" thus equal to or larger than "0" (YES route at step S77), "−1" is outputted as an output value (controlled variable outputted from the multi-rate block B6) "p->v" (step S81), and the process is terminated. Data at this time is summarized as follows:
p->v=−1
p->t=−2
p->next=P1
P1->v=2(=p->next->v)
P1->t=0
P1->next=P2
P2->v=4(=P1->next->v=p->next->next->v)
P2->t=2
P2->next=NULL After that, when the simulation cycle Δt is elapsed, the simulation subroutine is called and executed, and a trigger is not again detected (NO route at step S71), data becomes as follows in processes at steps s72 to S75:
p->v=−1
p->t=−3
p->next=P1
P1->v=2(=p->next->v)
P1->t=−1
P1->next=P2
P2->v=4(=P1->next->v=p->next->next->v)
P2->t=1
P2->next=NULL After that, the process gets out from the loop of steps S73 to S75 through YES route at step S73.

At this time, since "p->next" is not "NULL" but "P1" (NO route at step S76), and "p->next->t" is "−1" thus less than "0" (NO route at step S77), processes in items (5) through (7) are successively carried out at steps S78 to S80.

(5) q=p->next(=P1)
(6) delete p (release region p)
(7) p=q(=P1)

Responsive to this, the data becomes:
p->v=2(=P1)
p->t=−1
p->next=P2
P2->v=4(=p->next->v)
P2->t=1
P2->next=NULL Since "p->next" is not "NULL" but "P2" (NO route at step S76), and "p->next->t" is "1", thus equal to or larger than "0" (YES route at step S77), "2" is outputted as an output value (controlled variable outputted from the multi-rate block B6) "p->v" (step S81), and the process is terminated.

As above, the output value "p->v" is changed from "−1" to "2" at a predetermined timing. When "p->next" becomes "NULL" accompanying the process (YES route at step S76), "p->v" is kept outputted as an output value.

When a trigger is detected (YES route at step S71), new (unprocessed) multi-rate data maybe inputted from the input block with the trigger. For this, it is determined whether an unprocessed input (multi-rate data) exists or not (step S82).

When there is no unprocessed input (NO route at step S82), the procedure shift to step S72, at which the above process is performed. When there is an unprocessed input (YES route at step S82), processes at step S83 to S93 are carried out, whereby the unprocessed multi-rate data is arranged at an appropriate position in a multi-rate data sequence already held in a time series order, and the multi-rate data sequence including the unprocessed multi-rate data is held in the time series order.

Next, description will be made of a case where a trigger is detected following the above data state (YES route at step S71), and there is an unprocessed input (for example, v=3, t=3) (YES route at step S82) At this time, processes in items (8) to (13) below are successively carried out.

(8) An area is first secured, and a pointer thereof is set as "tmp" (supposing that tmp=P3; step S83).
(9) "tmp->v=3", "tmp->t=3", "tmp->next=NULL" are set as input values (step S84).
(10) Since "tmp->t(=3)" is larger than "p->t(=−1) (NO route at step S85),
(11) "q=P", so that "P1" is set as "q" (step S86).
(12) Since "q->next(=P2)" exists (NO route at step S87), and "q->next->t(=P2->t=1) is smaller than "tmp->t(=3)" (NO route at step S88), "q" is set to "q->next (=P2)" (step S89), and the procedure returns to step S87.
(13) Since "q->next(=P2->next=NULL)" does not exist this time (YES route at step S87), "q->next(=NULL)" is set as "tmp->next" (step S90), and "tmp(=3)" is set as "q->next" (step S91), then the procedure returns to step S82. After that, there is no unprocessed input in this example (NO route at step S82), the procedure shifts to step S72.

Through the above process, the data is updated as:
p->v=2(=P1)
p->t=−1
p->next=P2
P2->v=4(=p->next->v)
P2->t=1
P2->next=P3

P3->v=3(=P2->next->v=p->next->next->v)
P3->t=3
P3->next=NULL

When it is determined at step S85 that "tmp->t" is smaller than "p->t" (YES route at step S85), "p" is set as "tmp->next" (step S92), and "tmp" is set as "p" (step S93), then the procedure returns to step S82.

When a trigger is detected as above, a process of comparing magnitudes of times t of all new (unprocessed) inputs and arranging the inputs (multi-rate data) in ascending order of "t" is carried out.

[1-7] Parallel Processing of Simulation

When the virtual mechanism model 21 is configured with plural parts whose operations can be separately simulated, the model execution environment (simulator) 20 according to this embodiment is configured with a plurality of processors (refer to MCUs 12a to 12c in FIG. 15) which simulate in parallel operations of the plural parts, whereby the simulating process is sped up.

Figure 15:
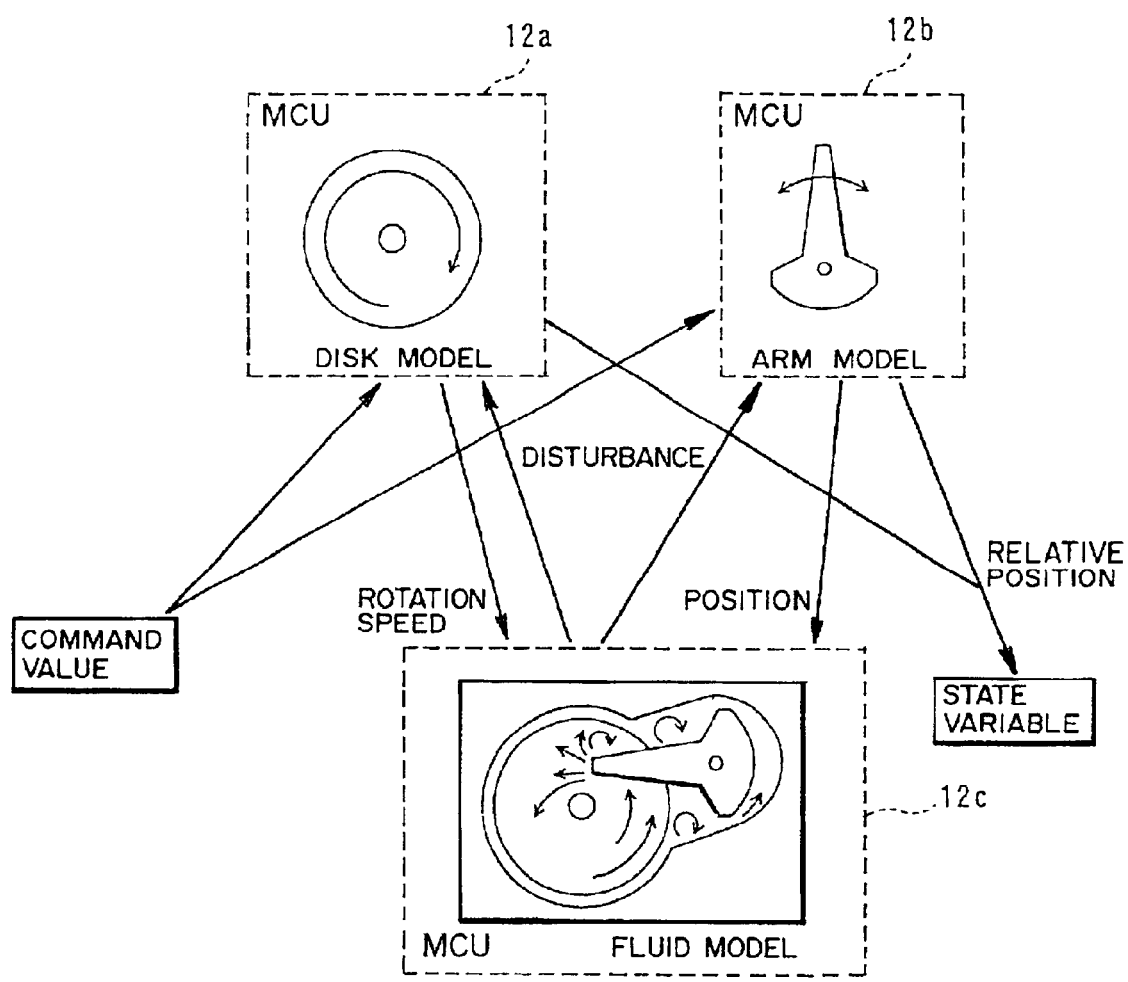
FIG. 15 is a diagram for illustrating parallel processing of simulation according to the embodiment.

When a controlled object (virtual mechanism model 21) is an HDD, for example, the virtual mechanism model 21 is divided into three portions having low correlation such as a disk model, an arm model and a fluid mode as shown in FIG. 15 in the model execution environment (simulator) 20 of this embodiment. Operations of the respective portions can be analyzed inparallel by individual processors (for example, MCUs 12a, 12b and 12c) to be simulated. The simulating process can be thereby largely sped up. FIG. 15 is a diagram for illustrating parallel processing of simulation according to this embodiment.

In this case, one of these MCUs 12a to 12c is a master, and the other slave MCUs carry out interruption or polling for a signal generated by the master, whereby simulation times of these MCU 12a to 12c are synchronized. A synchronization interval between models having low correlation such as an arm and a disk is servo interval (control cycle ΔT). On the other hand, a synchronization interval between models having more or less correlation such as models relating to fluid is the simulation interval (simulation cycle Δt).

[1-8] Detailed Structure and Various Functions of Holding Circuit

Figure 16:
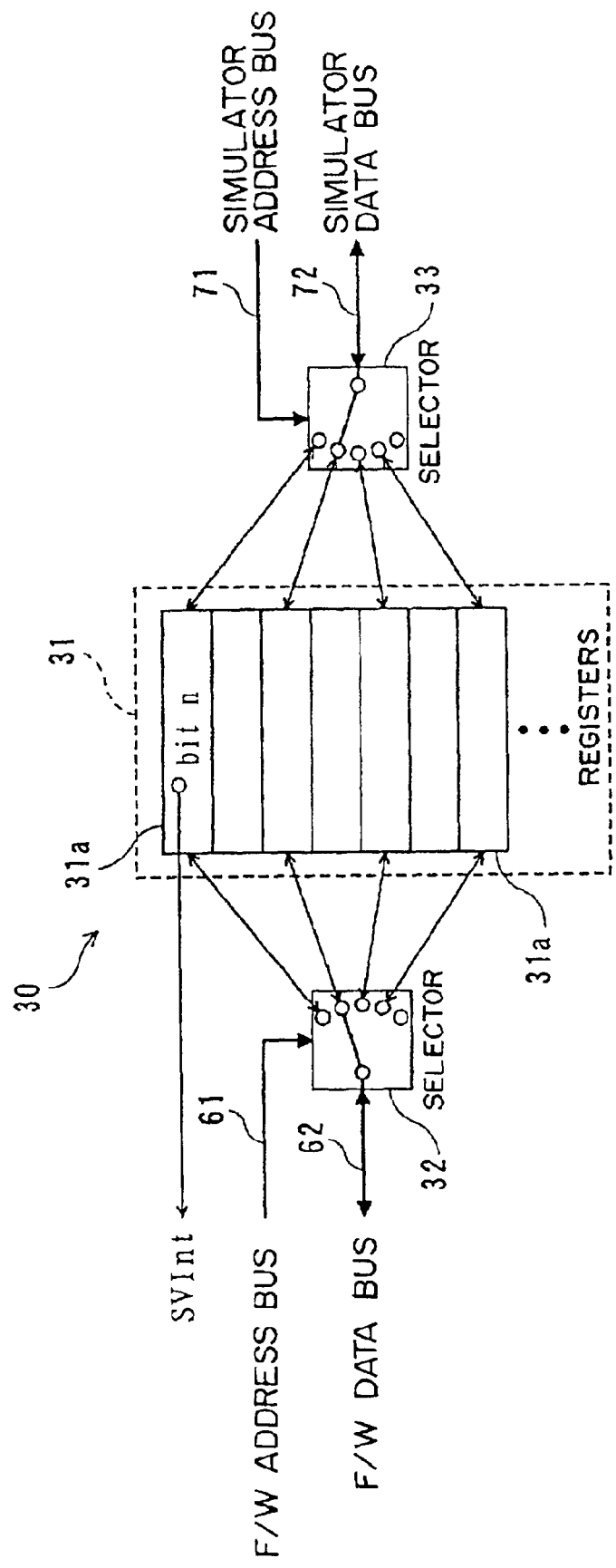
FIG. 16 is a block diagram for illustrating a structure of a holding circuit and handling of an interrupt signal according to the embodiment.

FIG. 16 is a block diagram for illustrating a structure of the holding circuit 30 and handling of the interrupt signal SVInt according to this embodiment.

The holding circuit 30 according to this embodiment has the shared memory 31 on a bus connecting two processors (control circuit 10 and simulator 20). In more detail, the holding circuit 30 comprises, as shown in FIG. 16, a plurality of registers 31a configuring the shared memory 31, a selector 32 functioning as a first write/read control unit, and a selector 33 functioning as a second write/read control unit.

The registers 31a can temporarily hold data including a controlled variable to be transferred from the control circuit 10 (control firmware) to the simulator 20 and a state variable to be transferred from the simulator 20 to the control circuit 10 (control firmware).

The selector 32 controls data writing/reading between the plural registers 31a and the control circuit 10. The selector 32 performs a switching operation such as to connect one of the plural registers 31a (register 31a according to address information) with an F/W data bus 62 according to address information given from the control circuit 10 through an F/W address bus 61.

The selector 33 controls data writing/reading between the plural register 31a and the simulator 20. The selector 33 performs a switching operation such as to connect one of the plural registers 31a (register 31a according to address information) with a simulator data bus 72 according to address information given from the simulator 20 through a simulator address bus 71.

In the above structure, a controlled variable from the control circuit 10 (firmware) is temporarily written in a designated register 31a through the data bus 62 and the selector 32, then inputted to the simulator 20 through the selector 33 and the data bus 72 according to a synchronous signal (clear of servo task signal). On the other hand, a state variable from the simulator 20 is temporarily written in a designated register 31a through the data bus 72 and the selector 33, then inputted to the control circuit 10 through the selector 32 and the data bus 62 according to a synchronous signal (interrupt signal SVInt).

At this time, the interrupt signal SVInt from the simulator 20 is written at a predetermined bit n in a specific register 31a (the uppermost register in FIG. 16) in the holding circuit 30 of this embodiment. A value of the bit n (interrupt signal SVInt) is directly outputted to the outside, and directly sent to the control circuit 10 from the register 31a not through the selector 32.

The control circuit 10 can thereby obtain the interrupt signal SVInt without a read control (reading operation of the firmware) by the selector 32, thus perform synchronous processing using hardware interruption. Therefore, it becomes unnecessary to perform polling to always monitor SVInt in the main loop of the firmware.

The shared memory 31 of the holding circuit 30 shown in FIG. 16 is configured with bi-directional accessible registers 31a. In order to simplify the circuit, the registers maybe configured with two kinds of registers; one exclusively used for writing by the control firmware and for reading by the simulator 20, and the other exclusively used for writing by the simulator 20 and for reading by the control firmware. Alternatively, only one side of the register 31a may be read/written. In such case, the interrupt signal SVInt is written at a predetermined bit in the register 31a that can be written from the simulator 20.

The object of this invention is to support development and debugging (validation) of a firmware (servo control program). To this effect, it is convenient at the time of debugging if it is possible to intercept communication contents between the control circuit 10 and the simulator 20, or fabricate the communication contents.

According to this embodiment, various functions as shown in FIGS. 17 through 20 are provided to the holding mechanism 30.

Figure 17:
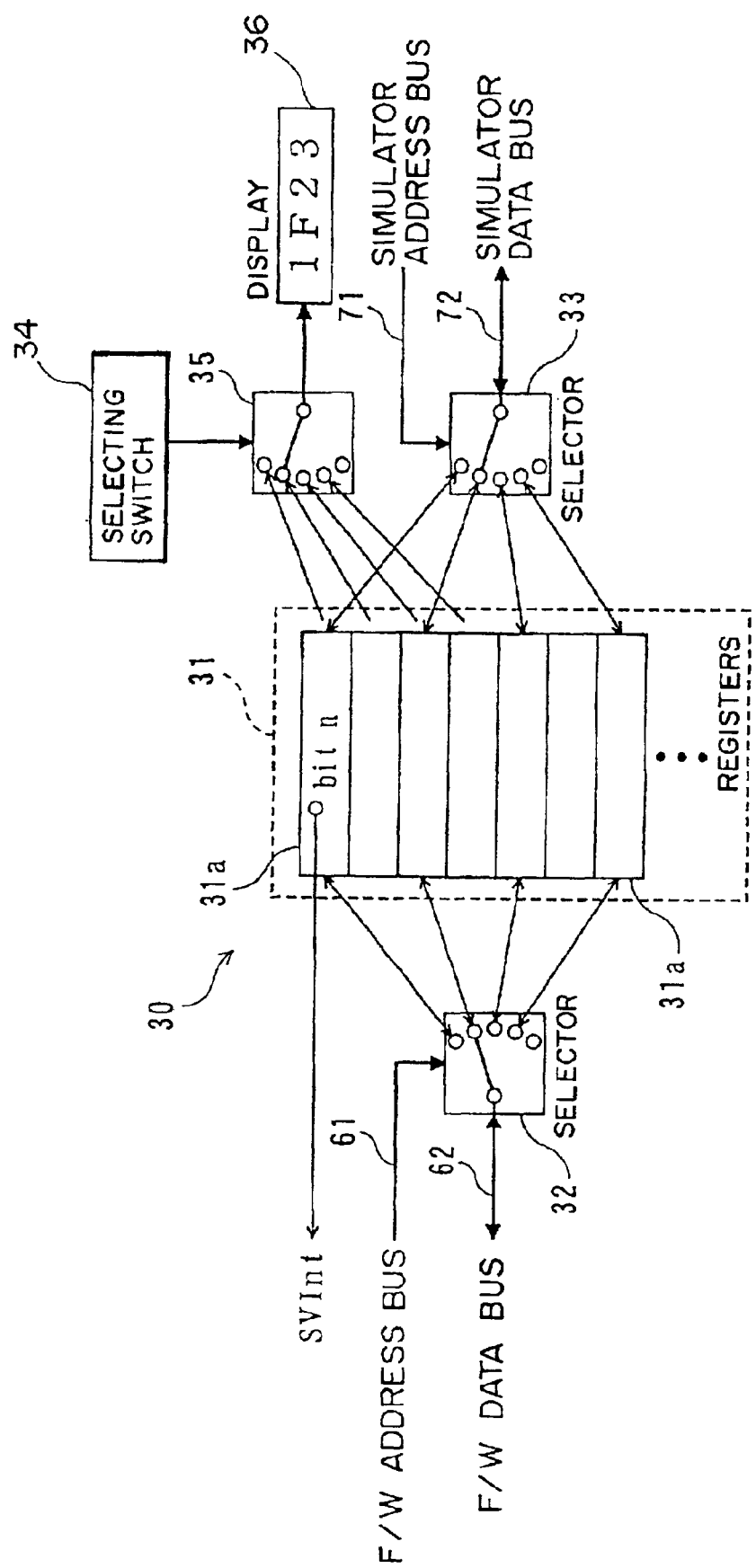
FIG. 17 is a block diagram showing a structure of a holding circuit having a function of displaying contents of an arbitrary register.
Figure 18:
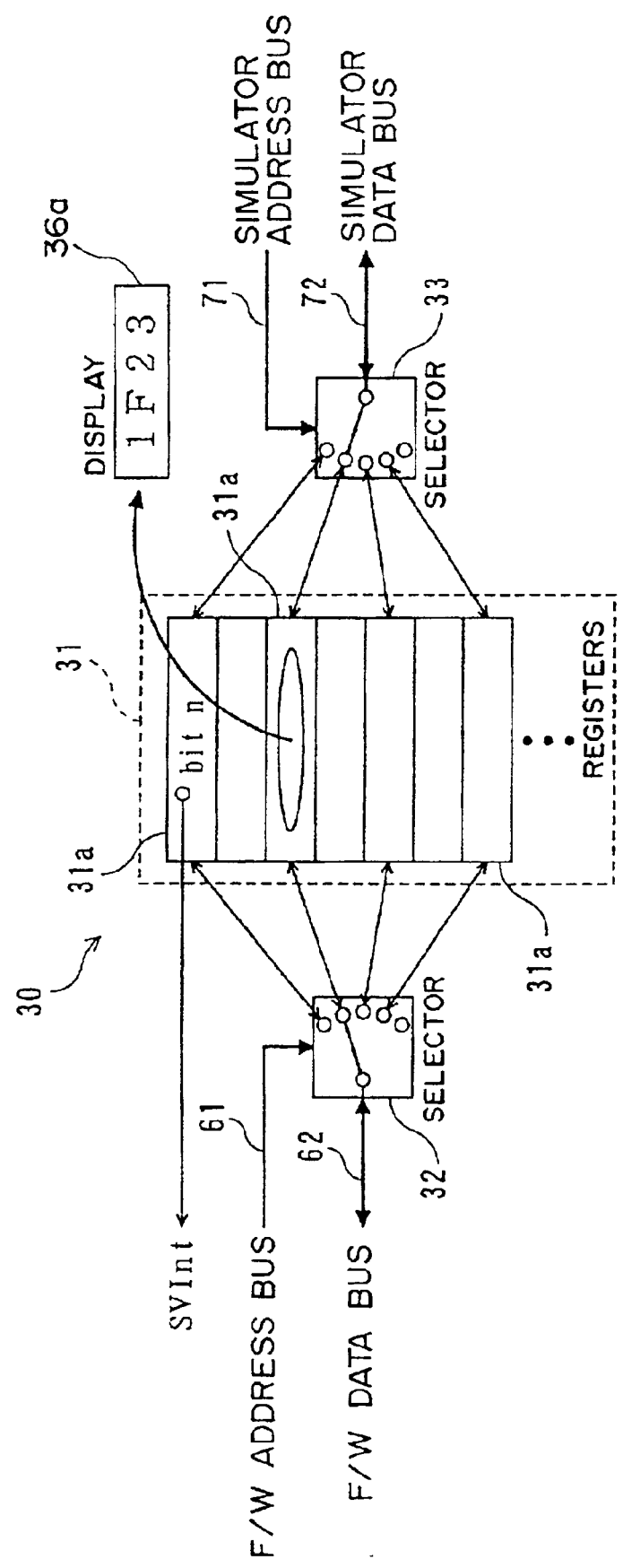
FIG. 18 is a block diagram showing a structure of a holding circuit having a function of displaying contents of a specific register.
Figure 19:
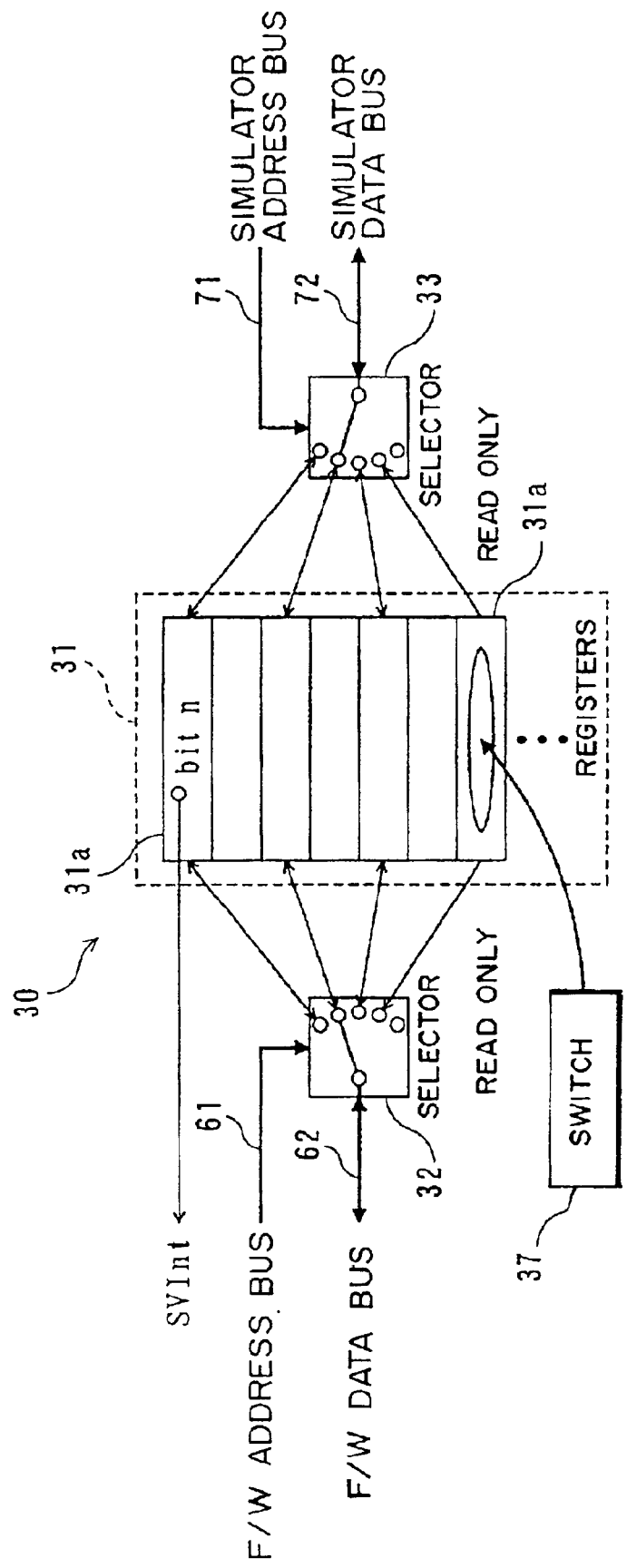
FIG. 19 is a block diagram showing a structure of a holding circuit having a function of setting data in a specific register.

FIG. 17 is a block diagram showing a structure of the holding circuit 30 having a function of displaying contents of an arbitrary register 31a. FIG. 18 is a block diagram showing the holding circuit 30 having a function of displaying contents of a specific register 31a. FIG. 19 is a block diagram showing a structure of the holding circuit 30 having a function of setting data in a specific register 31a. FIG. 20 is a block diagram showing a structure of the holding circuit 30 having a function of superposing noise on data from the register 31a.

The holding circuit 30 shown in FIG. 17 is provided with a data displaying segment (data display unit) 36 that can display data held in the plural registers 31a, and a register selecting switch (selecting unit) 34 and a selector (selecting unit) 35 for selecting and designating a register 31a for holding data to be displayed on the segment 36.

The register selecting switch 34 is formed with, for example, a dip switch, a rotary switch or the like to be operated by, for example, the operator. The selector 35 performs such a switching operation as to connect one (register 31a in response to a signal from the switch 34) of the plural registers 31a to the segment 36 responsive to the signal from the register selecting switch 34, and display data held in the register 31a on the segment 36.

The data being now communicated between the control circuit 10 and the simulator 20 and held in an arbitrary register 31a is displayed on the segment 36 according to a command from, for example, the operator, and the operator can refer and confirm the data.

In order to reduce the circuit size, the selector for bus 32 or 33 may be applied as the selector 35, and data maybe displayed on the segment 36 through the selector 32 or 33 only when the bus is not used.

Besides data is digitally displayed on the segment 36 as shown in FIG. 17, data selected by the selector 35 may be outputted as it is as digital signals to another computer to be recorded therein, or the data may be outputted in analog via a D/A converter to be displayed and observed on an oscilloscope.

As shown in FIG. 18, the switch 34 and the selector 35 may be omitted, and the register 31a holding data to be displayed on the displaying segment 36a may be fixed to a specific one. Namely, in the relay circuit 30 shown in FIG. 18, the segment 36a is directly connected to a specific one among the plural registers 31a to digitally display only data held in the specific register 31a.

The holding circuit 30 shown in FIG. 19 is provided with a switch (data input unit) 37 for forcedly setting and storing desired data in at least one of the plural registers 31a.

According to this embodiment, the switch 37 is formed with, for example, a dip switch, a rotary switch or the like to be manually operated by, for example, the operator. The switch 37 is directly connected to a specific one of the plural registers 31a, and data designated by the switch 37 is set in and inputted to the specific register 31a. The register 31a connected to the switch 37 is exclusive for reading.

By enabling the data set in the specific register 31a as above to be read by the firmware (or simulator 20), it is possible to confirm behavior of the control program or an operating state of the virtual mechanism model 21 according to the data, thereby supporting debugging of the control program.

Besides data is manually inputted through the switch 37, analog data given from the outside may be converted into digital data by an A/D converter to be set in and inputted to a specific register 31a, or digital data that is an output of another computer may be directly set in and inputted to the specific register 31a, whereby debugging is supported.

By using the function as shown in FIG. 19, it is possible to adjust a servo gain by manual input in real time, or analyze by an FFT (Fast Fourier Transform) analyzer.

When an FFT analyzer is used, an output (an analog signal) from the FFT analyzer is converted into a digital signal by an A/D converter since the FFT analyzer is to input/output analog signals, and set in a specific register 31a, and a response from the object (simulator 20 or firmware) is waited. A response (digital signal) from the object is converted into an analog signal by a D/A converter, then inputted to the FFT analyzer.

In the holding circuit 30 shown in FIG. 20, adders (noise superposing unit) 38a and 38b for superposing noise on data read out from a specific register 31a through the switch 39 are disposed on the both sides (on the side of the firmware and the side of the simulator 20) of the register 31a.

The operator, for example, can superpose noise on the data by the adders 38a and 38b, and confirm behavior of the firmware (control program) or an operating state of the model according to the noise.

In the example shown in FIG. 20, noise from the outside is added to the specific register 31a (address) by using the adders 38a and 38b. Alternatively, multipliers may be used instead of the adders 38a and 38b. In FIG. 20, the adders 38a and 38b are provided to the buses on both sides of the register 31a. Alternatively, the adder may be added to either one of the buses. Still alternatively, it is possible to add a function of adding noise to a read value from an arbitrary register by using a selector (not shown).

[1-9] Effects of the Embodiment

The control program development support apparatus 1 according to the embodiment of this invention delays the operating process in the control circuit 10 (MPU 12) to synchronize it with the model operating process (simulation) in the simulator 20, thereby performing accurate simulation as in slow motion while keeping time strictness without changing the servo characteristics. Therefore, it is possible to develop and debug (validate) the servo control program for a relatively small product having rapid response without using an actual mechanism.

Since it is possible to readily create a virtual mechanism model 21 having an arbitrary characteristic only by changing model parameters and control it by the servo control program (firmware), it is possible to certain validate how much the servo control program can cope with variations in a product manufactured in large volume, that is, to certainly validate a quantity of the servo control program. Since disturbance can be given at an arbitrary timing, it is possible to validate a quality of the servo control program more certainly.

By simulating using the virtual mechanism model 21, it becomes possible to use functions such as event breaking, step debugging and the like, readily develop the servo control program, and validate a new control method using a new actuator or sensor in a simple manner.

The operator, for example, can readily and arbitrarily perform synchronous setting between an operation of the simulator 20 and an operation of the control circuit 10 (firmware) using the synchronous setting means (GUI function) described above with reference to FIGS. 5 and 8.

The multi-rate control, in which a controlled variable is changed during one control cycle, is simulated by using the multi-rate control means described above with reference to FIGS. 8 through 10. The control program development support apparatus 1 of this embodiment can therefore certainly cope with a case where the servo logic realizes the multi-rate control. At this time, the operator, for example, uses the multi-rate setting means (GUI function) described above with reference to FIG. 8 to readily and arbitrarily define and set the multi-rate control.

Since the process can be shifted to the servo control routine according to a result of simulation by the simulator 20 as described above with reference to FIG. 7, it is possible to realize various functions such as confirming the fail-safe function by a timer, coping with a process of measuring a changed variable (velocity, rotation number or the like) per unit time, thereby certainly supporting development and debugging (validation) of the servo control program.

As described above with reference FIG. 15, simulation of the operation of the structure of the virtual mechanism model 21 can be carried out in parallel by a plurality of processors (MCU 12a to 12c in this embodiment), so that the simulating process can be greatly sped up.

As shown in FIGS. 16 through 20 in this embodiment, the holding circuit 30 is configured with the plural registers 31a, and selectors 32 and 33. It is thereby possible to certainly transfer a controlled variable from the control circuit 10 to the simulator 20 and a state variable from the simulator 20 to the control circuit 10 after temporarily holding them in the registers 31a.

At this time, the firmware's side (control circuit 10) can obtain the interrupt signal SVInt without the reading control by the selector 32, so that the synchronous processing can be performed using hardware interrupt, and the control circuit 10 can initiate immediately and certainly the operation of calculating a controlled variable, according to the interrupt signal SVInt.

As shown in FIGS. 17 and 18, the operator, for example, can refer and confirm data on the segment 36 or 36a displaying data being now communicated between the control circuit 10 and the simulator 20, whereby development and debugging (validation) of the servo control program is certainly supported.

As shown in FIG. 19, the operator, for example, can write arbitrary data in the registers 31a through the switch 37 to directly input the data in the control circuit 10 or the simulator 20. The operator, for example, can thereby confirm behavior of the servo control program or an operating state of the virtual mechanism model 21 according to the data, whereby development and debugging (validation) of the servo control program is certainly supported.

As shown in FIG. 20, the operator, for example, can superpose noise on data by the adders 38a and 38b to confirm behavior of the servo control program or an operating state of the model according to the noise, whereby development and debugging (validation) of the servo control program is certainly supported.

[2] Others

Note that the present invention is not limited to the above embodiment, but may be modified in various ways without departing from the scope of the invention.

For example, the embodiment has been described by way of example where the controlled object is a magnetic disk drive (HDD). The present invention is not limited to this example. The present invention may be applied to every field requiring a precise servo control such as an optical disk (CD, MO, DVD, MD), a magnetic tape unit (DAT, VTR), an NC machine tool or the like. Additionally, the above embodiment has been described by way of example where the controlled object is a servo mechanism. However, the present invention is not limited to such a servo mechanism.

What is claimed is:

1. A control program development support apparatus comprising:

a control program execution unit for executing a control program, which controls an operation of a mechanism, to calculate and output a controlled variable for said mechanism in a predetermined cycle;

a simulation unit, in which said mechanism is configured as a virtual model, for simulating, in a predetermined cycle which is set shorter than said predetermined control cycle, an operation of said mechanism for a time corresponding to said predetermined control cycle, by using said model, to calculate and output a state variable of said mechanism;

a holding unit, arranged between said control program execution unit and said simulation unit, for temporarily holding said controlled variable from said control program execution unit to transfer said controlled variable to said simulation unit, whereas temporarily holding said state variable from said simulation unit to transfer said state variable to said control program executing unit; and a simulation control unit for making said simulation unit shift to a state of waiting for a response from said control program execution unit and making said control program execution unit initiate an operation of calculating a controlled variable according to said state variable when said state variable from said simulation unit is held in said holding unit, whereas making said control program execution unit shift to a state of waiting for a response from said simulation unit and making said simulation unit initiate a simulating operation according to said controlled variable when said controlled variable from said control program execution unit is held in said holding unit.

2. A control program development support apparatus comprising:

a control program execution unit for executing a control program, which controls an operation of a servo mechanism, to calculate and output a controlled variable for said servo mechanism in a predetermined control cycle;

a simulation unit, in which said servo mechanism is configured as a virtual model, for simulating, in a predetermined simulation cycle which is set shorter than said predetermined control cycle, an operation of said servo mechanism for a time corresponding to said predetermined control cycle, while dynamically analyzing the operation of said servo mechanism by using said model, to calculate and output a state variable of said servo mechanism;

a holding unit, arranged between said control program execution unit and said simulation unit, for temporarily holding said controlled variable from said control program execution unit to transfer said controlled variable to said simulation unit, whereas temporarily holding said state variable from said simulation unit to transfer said state variable to said control program executing unit; and a simulation control unit for making said simulation unit shift to a state of waiting for a response from said control program execution unit and making said control program execution unit initiate an operation of calculating a controlled variable according to said state variable when said state variable from said simulation unit is held in said holding unit, whereas making said control program execution unit shift to a state of waiting for a response from said simulation unit and making said simulation unit initiate a simulating operation according to said controlled variable when said controlled variable from said control program execution unit is held in said holding unit.

3. The control program development support apparatus according to claim 2 further comprising a synchronous setting means for performing synchronous setting of said simulation control unit.

4. The control program development support apparatus according to claim 3, wherein said synchronous setting means is configured using a graphical user interface function.

5. The control program development support apparatus according to claim 2, wherein said control program execution unit outputs a plurality of controlled variables to be inputted to said simulation unit at different timings during one control cycle; and said control program development support apparatus further comprises a multi-rate control means for performing an input control on said plural controlled variables such that said controlled variables are inputted to said simulation unit at respective predetermined timings.

6. The control program development support apparatus according to claim 5 further comprising a multi-rate setting means for performing setting of said multi-rate control means.

7. The control program development support apparatus according to claim 6, wherein said multi-rate setting means is configured using a graphical user interface function.

8. The control program development support apparatus according to claim 2, wherein said simulation control unit determines a timing, at which said control program execution unit starts calculating said controlled variable, on the basis of a result of simulation by said simulation unit.

9. The control program development support apparatus according to claim 2, wherein said model is configured with a plurality of parts of which operations can be separately simulated; and said simulation unit comprises a plurality of processors for simulating in parallel the operations of said plural parts.

10. The control program development support apparatus according to claim 2, wherein said holding unit comprises:

a plurality of registers for temporarily holding data including said controlled variable to be transferred from said control program execution unit to said simulation unit and said state variable to be transferred from said simulation unit to said control program execution unit;

a first write/read control unit for controlling writing/reading of said data between said plural registers and said control program execution unit; and a second write/read control unit for controlling writing/reading of said data between said plural registers and said simulation unit.

11. The control program development support apparatus according to claim 10, wherein an interrupt signal, which is inputted to one of said plural registers from said simulation unit in order to make said control program execution unit initiate the operation of calculating said controlled variable, is directly sent from said register to said control program execution unit without reference to said first write/read control unit.

12. The control program development support apparatus according to claim 10 further comprising a data display unit for displaying data held in said plural registers.

13. The control program development support apparatus according to claim 12 further comprises a selecting unit for selecting at least one register from said plural registers to make said data display unit display data held in said selected register.

14. The control program development support apparatus according to claim 12, wherein said data display unit is directly connected to a specific register among said plural registers to display data held in said specific register.

15. The control program development support apparatus according to claim 10 further comprises a data input unit for forcedly setting and storing desired data in at least one of said plural registers.

16. The control program development support apparatus according to claim 15, wherein said data input unit is directly connected to a specific register among said plural registers to set said desired data in said specific register.

17. The control program development support apparatus according to claim 1 further comprises a noise superposing unit for superposing noise on data read out from at least one of said plural registers.

* * * * *

UNITED STATES PATENT AND TRADEMARK OFFICE
CERTIFICATE OF CORRECTION

PATENT NO. : 6,804,636 B2
DATED : October 12, 2004
INVENTOR(S) : Yosuke Senta et al.

It is certified that error appears in the above-identified patent and that said Letters Patent is hereby corrected as shown below:

Title page,
Item [56], References Cited, U.S. PATENT DOCUMENTS, insert
-- 6,243,610    6/2001  Lino et al.
   5,812,432    9/1998  Takizawa et al. --
OTHER PUBLICATIONS, "Luk et al." reference, change "Pakage" to -- Package --.

Signed and Sealed this

First Day of March, 2005

JON W. DUDAS
*Director of the United States Patent and Trademark Office*